(12) United States Patent
Bowman

(10) Patent No.: US 10,967,715 B2
(45) Date of Patent: Apr. 6, 2021

(54) BRACKET TO CONNECT INTERIOR DOOR TRIM GRAB HANDLE WITH INTEGRATED WINDOW REGULATOR CARRIER

(71) Applicant: Ford Global Technologies, LLC, Dearborn, MI (US)

(72) Inventor: Eric Bowman, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/565,709

(22) Filed: Sep. 10, 2019

(65) Prior Publication Data
US 2020/0001689 A1 Jan. 2, 2020

Related U.S. Application Data

(62) Division of application No. 16/398,692, filed on Apr. 30, 2019, now Pat. No. 10,486,510, which is a division of application No. 15/651,518, filed on Jul. 17, 2017, now Pat. No. 10,350,973.

(51) Int. Cl.
*E05B 1/00* (2006.01)
*B60J 5/04* (2006.01)
*B60R 13/02* (2006.01)

(52) U.S. Cl.
CPC .......... *B60J 5/0434* (2013.01); *B60J 5/0416* (2013.01); *B60R 13/0243* (2013.01)

(58) Field of Classification Search
CPC . B60J 5/00; B60J 5/0422; B60J 5/0454; B60J 5/04; B60J 5/0425; B60J 5/0418; B60J 5/0416; B60R 13/0243; B60R 13/0206; B60R 2013/0287

USPC ............ 49/460, 502, 501; 296/146.7, 146.5, 296/146.6
See application file for complete search history.

(56) References Cited

U.S. PATENT DOCUMENTS

| | | | |
|---|---|---|---|
| 4,648,208 A | 3/1987 | Baldamus et al. |
| 5,232,261 A | 8/1993 | Kuroda et al. |
| 5,355,629 A | 10/1994 | Kimura et al. |
| 5,529,370 A | 6/1996 | Veit |
| 5,897,157 A | 4/1999 | Yamaguchi et al. |
| 5,904,022 A | 5/1999 | Zadok |
| 6,070,931 A | 6/2000 | Yamaguchi et al. |
| 6,168,226 B1 | 1/2001 | Wycech |
| 6,176,542 B1 | 1/2001 | Gooding et al. |

(Continued)

*Primary Examiner* — Chi Q Nguyen
(74) *Attorney, Agent, or Firm* — David Coppiellie; Price Heneveld LLP

(57) ABSTRACT

An integrated window regulator carrier for a door of a vehicle comprising: a side; a vertical channel recessed into the side, with a first channel wall and a second channel wall defining lateral edges of the vertical channel; a first receiver disposed to a first side of the vertical channel, and projecting outward from the side; and a second receiver disposed to a second side of the vertical channel and projecting outward from the side, and opposing the first receiver. Each of the first receiver and the second receiver comprises: a bottom retaining surface; a first retaining surface extending at least approximately orthogonally upward from the bottom retaining surface; and a second retaining surface opposing the first retaining surface, the second retaining surface extending at least approximately orthogonally upward from the bottom retaining surface. Each of the first receiver and the second receiver can include a snap-fit receiver.

20 Claims, 20 Drawing Sheets

(56) References Cited

U.S. PATENT DOCUMENTS

| | | | |
|---|---|---|---|
| 6,192,632 B1* | 2/2001 | Medebach | B60J 5/0416 296/146.7 |
| 6,381,906 B1 | 5/2002 | Pacella et al. | |
| 6,493,919 B2 | 12/2002 | Morrison et al. | |
| 6,615,546 B2 | 9/2003 | Furuyama et al. | |
| 6,932,416 B2 | 8/2005 | Clauson | |
| 6,983,978 B2 | 1/2006 | Radu et al. | |
| 7,076,918 B2* | 7/2006 | Tatsumi | B60J 5/0416 49/349 |
| 7,380,865 B2 | 6/2008 | Eckhardt et al. | |
| 7,607,716 B2* | 10/2009 | Buchta | B60J 5/0416 296/146.6 |
| 7,610,720 B2* | 11/2009 | Kirejczyk | E05F 11/483 49/349 |
| 8,602,483 B2 | 12/2013 | Svedberg et al. | |
| 8,776,438 B2* | 7/2014 | Pleiss | E05F 11/382 49/348 |
| 9,126,470 B2 | 9/2015 | Kaliomaki et al. | |
| 9,132,721 B2* | 9/2015 | Fortin | B60J 5/0401 |
| 9,434,242 B2 | 9/2016 | Yamada et al. | |
| 10,350,973 B2 | 7/2019 | Bowman | |
| 10,486,510 B2* | 11/2019 | Bowman | B60J 5/0416 |
| 2001/0030444 A1 | 10/2001 | Whitehead et al. | |
| 2002/0046505 A1 | 4/2002 | Seksaria et al. | |
| 2002/0069609 A1 | 6/2002 | Nees et al. | |
| 2002/0112406 A1* | 8/2002 | Tokui | B60J 5/0416 49/502 |
| 2003/0097798 A1 | 5/2003 | Staser | |
| 2008/0276541 A1* | 11/2008 | Roy | B60J 5/0413 49/502 |
| 2009/0008959 A1 | 1/2009 | Rehn | |
| 2009/0184501 A1 | 7/2009 | Hirotani | |
| 2010/0097798 A1* | 4/2010 | Young | F21V 29/83 362/235 |
| 2013/0168996 A1 | 7/2013 | Svedberg et al. | |
| 2014/0117706 A1 | 5/2014 | Fortin | |
| 2014/0125087 A1 | 5/2014 | Kalliomaki et al. | |
| 2014/0361575 A1* | 12/2014 | Weber | B60J 5/0422 296/146.6 |
| 2014/0361576 A1* | 12/2014 | Storgato | B60J 5/0484 296/146.6 |
| 2015/0151616 A1 | 6/2015 | Makowski et al. | |

\* cited by examiner

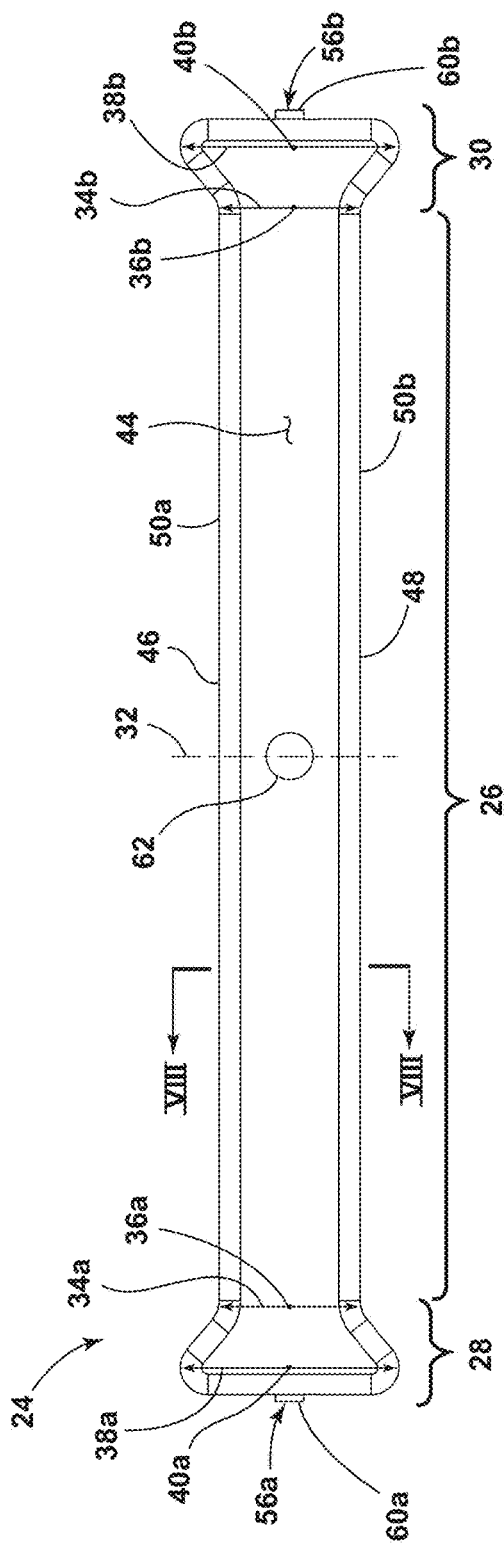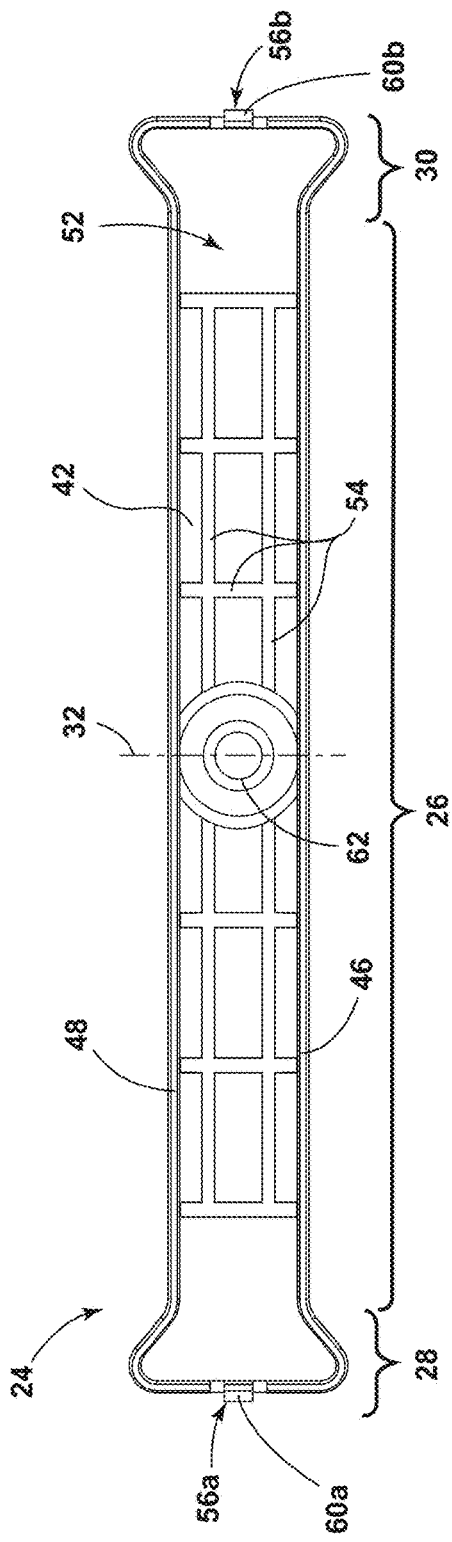
FIG. 4
FIG. 5

BRACKET TO CONNECT INTERIOR DOOR TRIM GRAB HANDLE WITH INTEGRATED WINDOW REGULATOR CARRIER

CROSS-REFERENCE TO RELATED APPLICATIONS

This application is a divisional of and claims priority to U.S. patent application Ser. No. 16/398,692, filed on Apr. 30, 2019, now U.S. Pat. No. 10,486,510, entitled "BRACKET TO CONNECT INTERIOR DOOR TRIM GRAB HANDLE WITH INTEGRATED WINDOW REGULATOR CARRIER," which is a divisional of and claims priority to U.S. patent application Ser. No. 15/651,518, now U.S. Pat. No. 10,350,973, filed on Jul. 17, 2017, entitled "BRACKET TO CONNECT INTERIOR DOOR TRIM GRAB HANDLE WITH INTEGRATED WINDOW REGULATOR CARRIER," the contents of which are relied upon and incorporated herein by reference in their entirety.

FIELD OF THE DISCLOSURE

The present invention generally relates to a passenger door assembly for a vehicle and, more specifically, to the attachment of an interior door trim to an integrated window regulator carrier.

BACKGROUND OF THE DISCLOSURE

A passenger door assembly for a vehicle sometimes utilizes an integrated window regulator carrier attached to, or as part of, a frame and an interior door trim to cover the integrated window regulator carrier and part of the frame. An interior door trim sometimes includes a grab handle for a passenger to grab to close the passenger door assembly.

SUMMARY OF THE DISCLOSURE

According to a first aspect of the present disclosure, an integrated window regulator carrier for a door of a vehicle comprises: a side; a vertical channel recessed into the side, with a first channel wall and a second channel wall defining lateral edges of the vertical channel; a first receiver disposed to a first side of the vertical channel, and projecting outward from the side; and a second receiver disposed to a second side of the vertical channel and projecting outward from the side, and opposing the first receiver; each of the first receiver and the second receiver comprising: a bottom retaining surface; a first retaining surface extending at least approximately orthogonally upward from the bottom retaining surface; and a second retaining surface opposing the first retaining surface, the second retaining surface extending at least approximately orthogonally upward from the bottom retaining surface.

Embodiments of the first aspect of the disclosure can include any one or a combination of the following features:
the first receiver is a mirror image of the second receiver;
each of the first receiver and the second receiver includes a lateral retaining surface that extends at least approximately orthogonally upward from the bottom retaining surface;
the lateral retaining surface of the first receiver opposes the lateral retaining surface of the second receiver;
the first retaining surface and the second retaining surface of both the first receiver and the second receiver are separated by a distance;
the lateral retaining surface has a length that is parallel to the bottom retaining surface and longer than the distance between the first retaining surface and the second retaining surface;
each of the first receiver and the second receiver comprises: a first transition surface portion that forms a contiguous surface transition between the first retaining surface and the lateral retaining surface; and a second transition surface portion that forms a contiguous surface transition between the second retaining surface and the lateral retaining surface;
the first transition surface portion and the second transition surface portion extend at least approximately orthogonally upward from the bottom retaining surface;
for each of the first receiver and the second receiver, the first retaining surface transitions to the first transition surface portion at an obtuse angle, and the second retaining surface transitions to the second transition surface portion at an obtuse angle;
each of the first receiver and the second receiver include a snap-fit receiver;
the snap-fit receiver of each of the first receiver and the second receiver include an aperture and a catch abutting surface accessible through the aperture;
the integrated window regulator carrier further comprises an aperture through the side that is configured to accept a window regulator motor shaft;
the integrated window regulator carrier further comprises a bracket including a first end portion, a second end portion, and an elongated middle portion disposed between the first end portion and the second end portion;
the first receiver is connected to the first end portion of the bracket, with the bottom retaining surface, the first retaining surface, and the second retaining surface of the first receiver facing the bracket;
the second receiver is connected to the second end portion of the bracket, with the bottom retaining surface, the first retaining surface, and the second retaining surface of the second receiver facing the bracket; and
the bracket extends across the vertical channel.

According to a second aspect of the present disclosure, an integrated window regulator carrier comprises: a vertical channel; and a pair of opposing bracket receivers, one of which is disposed to one side of the vertical channel, the other of which is disposed to the other side of the vertical channel, each of the opposing bracket receivers comprising: a bottom retaining surface, a first retaining surface extending upward from the bottom retaining surface, and a second retaining surface extending upward from the bottom retaining surface and opposing the first retaining surface.

Embodiments of the second aspect of the disclosure can include any one or a combination of the following features:
the integrated window regulator carrier further comprises a speaker hub;
the vertical channel is recessed and comprises a first channel wall and a second channel wall that opposes the first channel wall;
the integrated window regulator carrier further comprises: a bracket received by each of the opposing bracket receivers, with the bottom retaining surface of each of the opposing bracket receivers supporting the bracket from beneath the bracket, the first retaining surface of each of the opposing bracket receivers facing the bracket, and the second retaining surface of each of the opposing bracket receivers facing the bracket;

each of the opposing bracket receivers further comprising a snap-fit receiver that includes a catch abutting surface;

the bracket includes snap-fit fasteners, each of which includes a catch flange;

the snap-fit receivers of the opposing bracket receivers are operably connected with the snap-fit fasteners of the bracket, with the catch abutting surface of each of the snap-fit receivers abutting the catch flange of one of the snap-fit fasteners of the bracket;

the bracket spans across the vertical channel;

the bracket further includes an aperture disposed through a top wall of the bracket;

each of the opposing bracket receivers further comprises a lateral retaining surface that extends approximately upward from the bottom retaining surface and that is at least approximately orthogonal to both the first retaining surface and the second retaining surface;

the lateral retaining surface of one of the opposing bracket receivers opposes the lateral retaining surface of the other of the opposing bracket receivers; and the lateral retaining surface of each of the opposing bracket receivers faces the bracket.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is an overhead view of the bracket of FIG. 2, illustrating the first end portion and the second end portion having a first width at a first point and a wider second width at a second point;

FIG. 5 is an underneath view of the bracket of FIG. 2, illustrating the elongated middle portion having a first side wall, a second side wall, and a top wall forming an interior chamber;

DETAILED DESCRIPTION OF THE PREFERRED EMBODIMENTS

Figure 1:
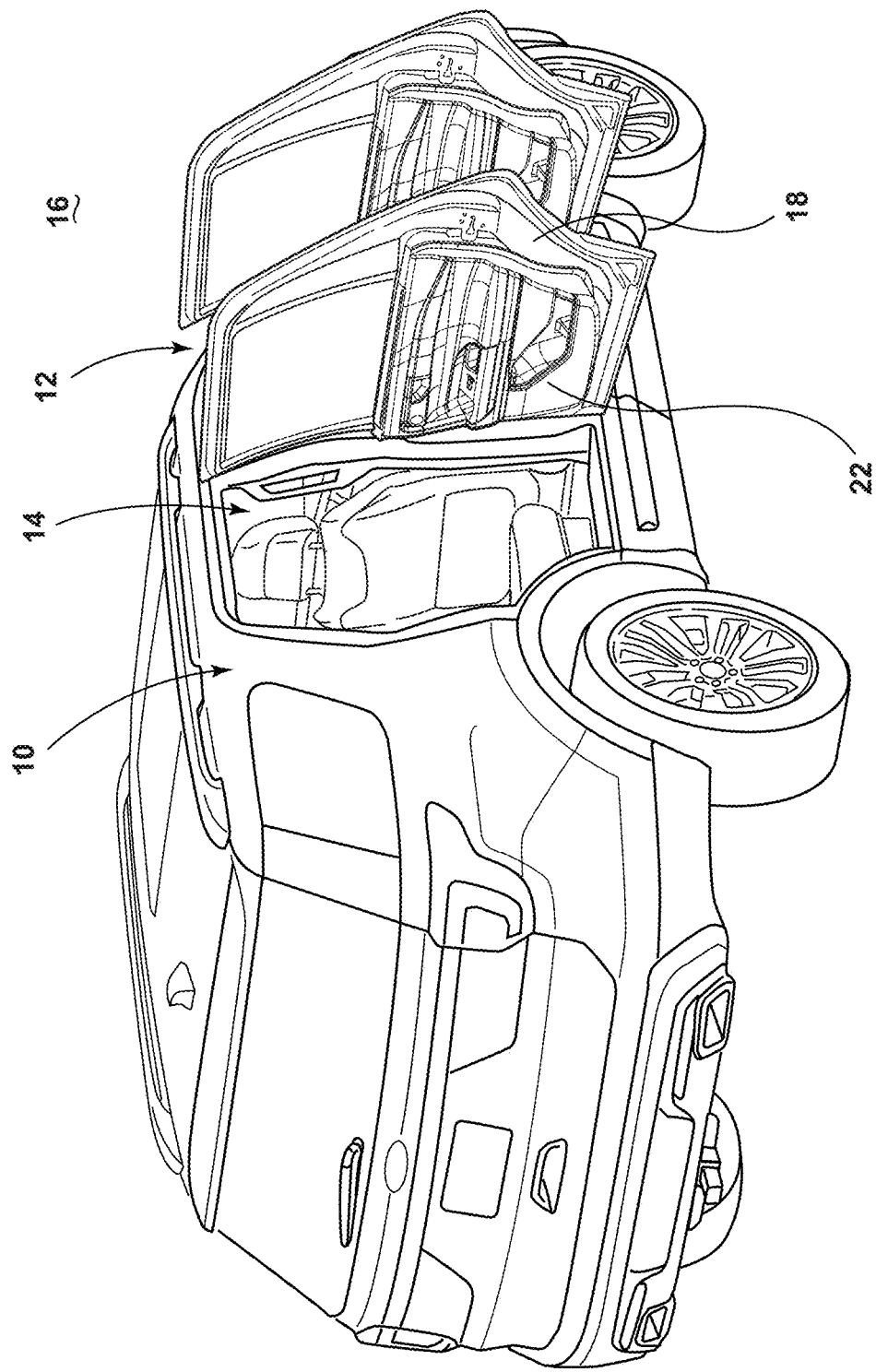
FIG. 1 is a perspective view of a vehicle illustrating a passenger door assembly with an interior door trim panel and a frame.
Figure 2:
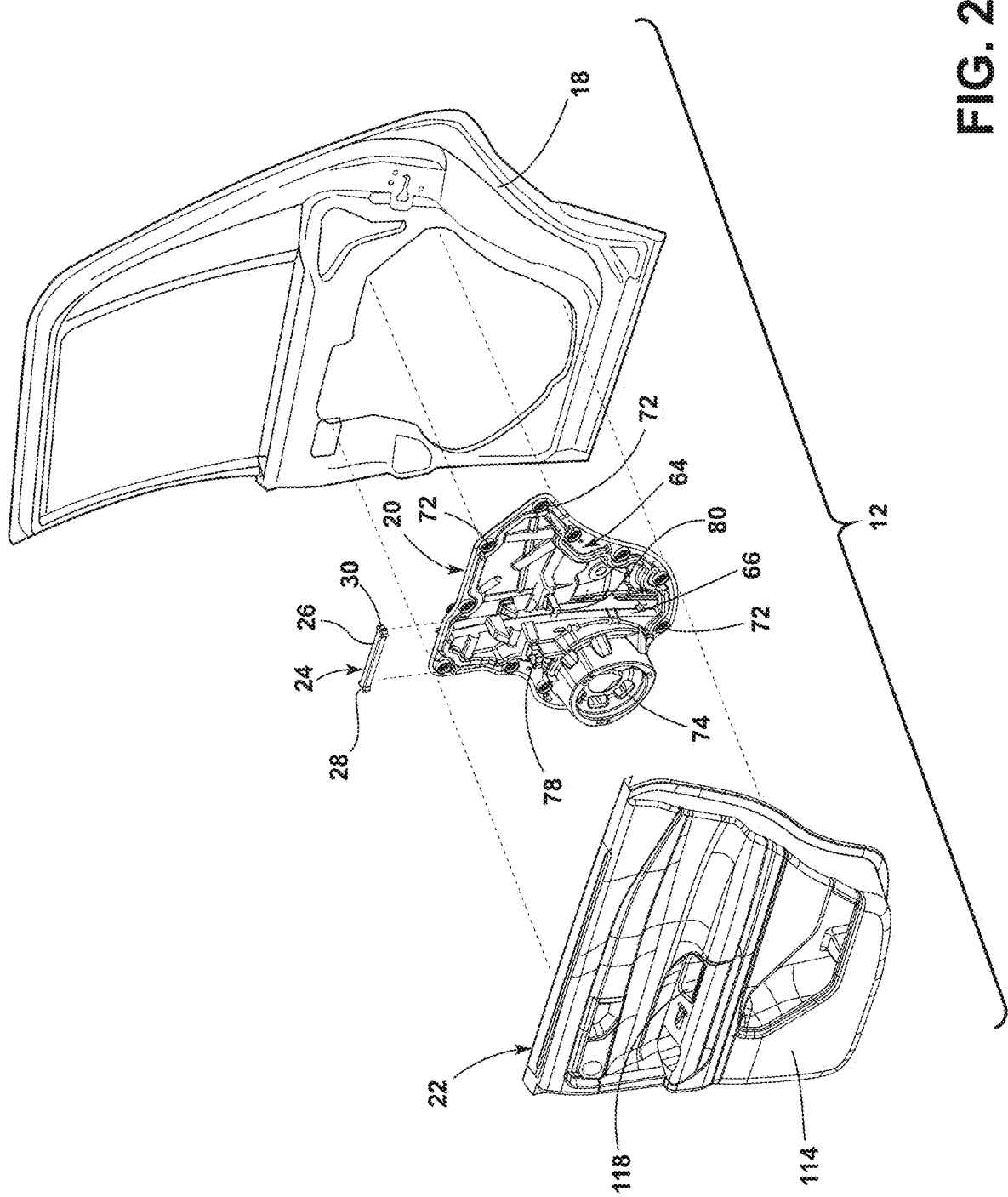
FIG. 2 is an exploded perspective view of components of the passenger door of FIG. 1, including an integrated window regulator carrier and bracket of the present disclosure.
Figure 3:
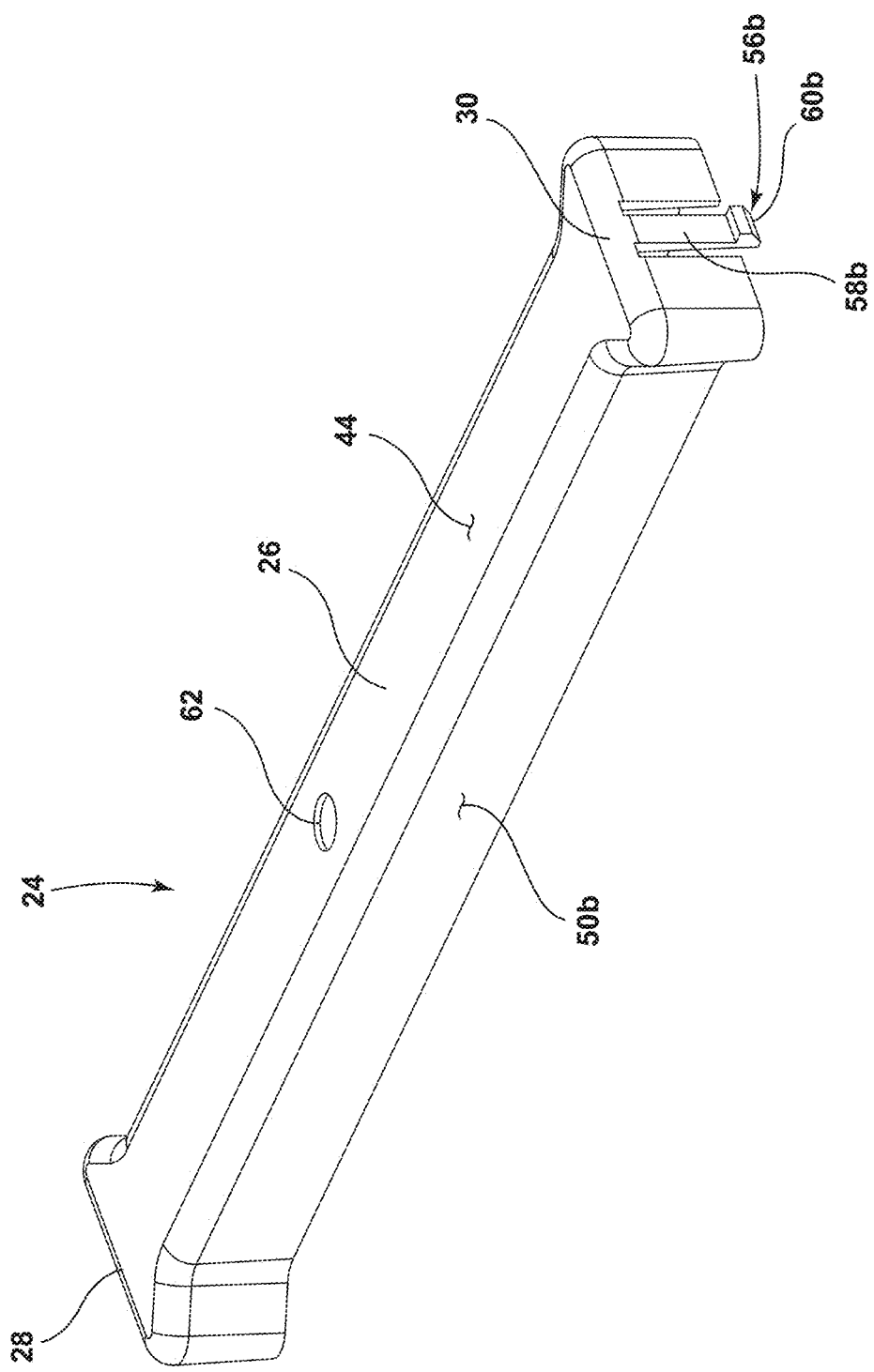
FIG. 3 is a perspective view of the bracket of FIG. 2 illustrating an aperture disposed at an elongated middle portion between a first end portion and a second end portion.
Figure 6:
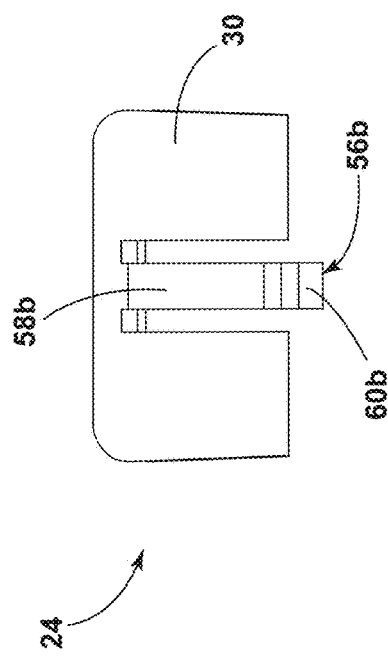
FIG. 6 is a view of the bracket of FIG. 2, illustrating a snap-fit fastener at the second end portion having a cantilever portion terminating with a catch flange.
Figure 7:
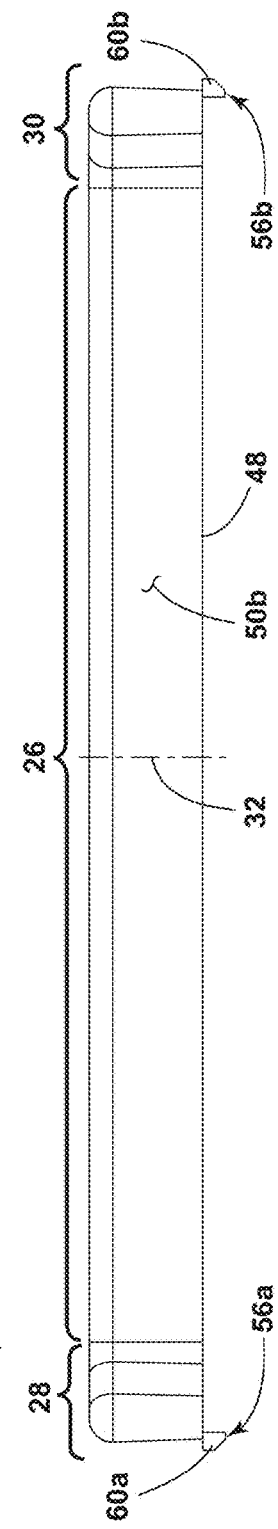
FIG. 7 is a view of the bracket of FIG. 2, illustrating a planar exterior surface of the second side wall and the symmetrical shape of the bracket about a midline.
Figure 8:
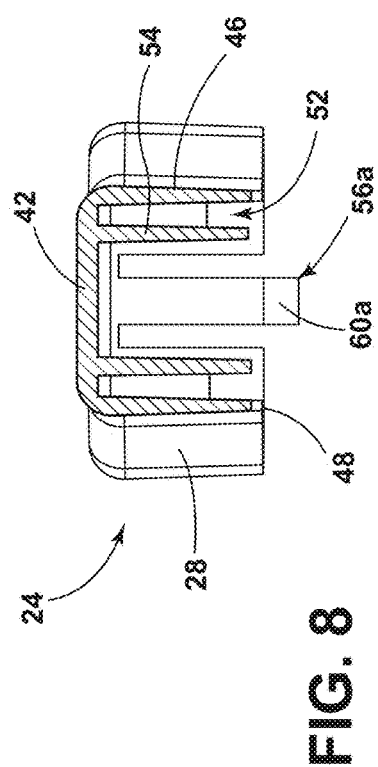
FIG. 8 is a cross-sectional view of the bracket of FIG. 2 taken through line VIII-VIII of FIG. 4, illustrating strengthening portions disposed within the interior chamber.
Figure 9:
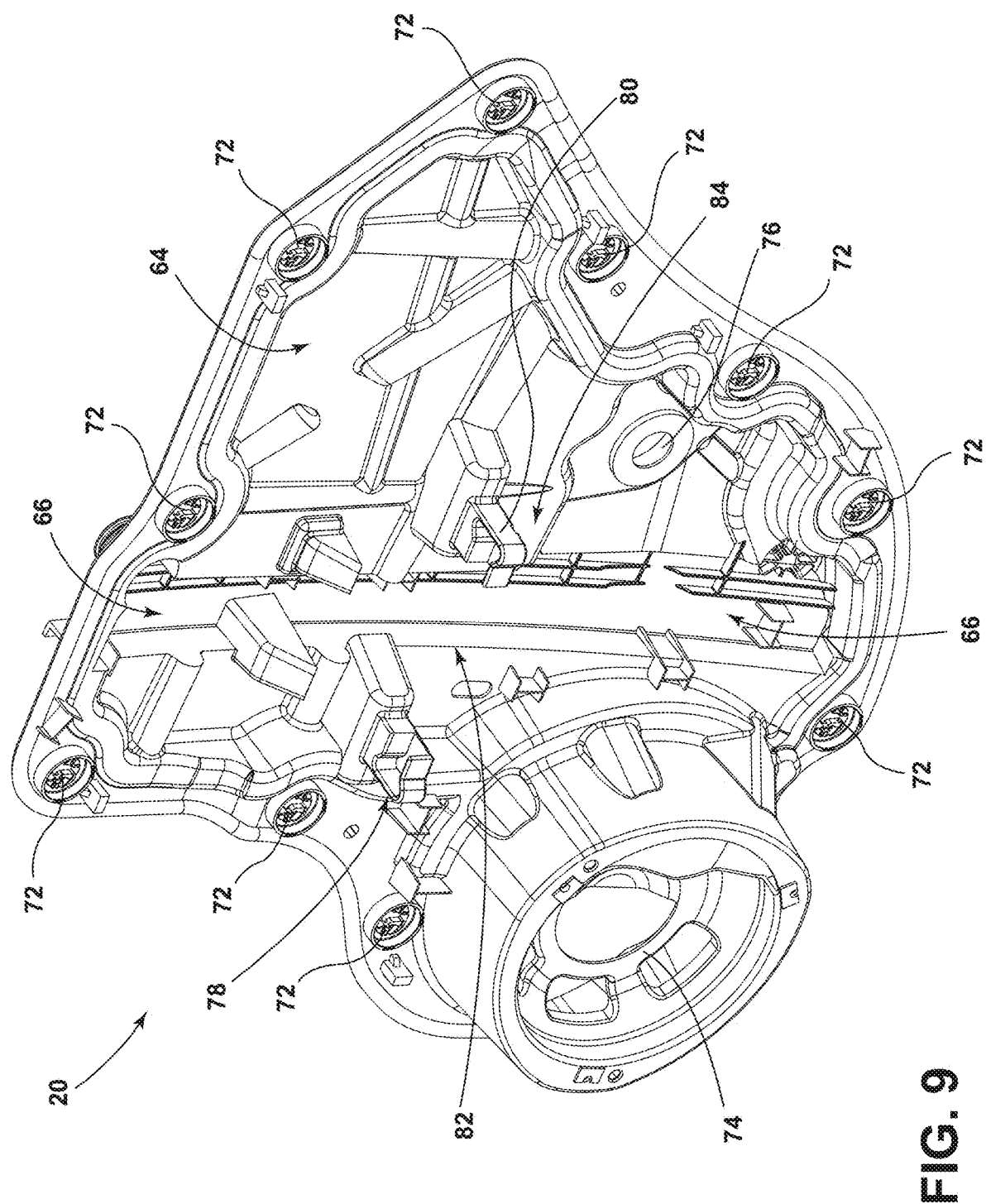
FIG. 9 is a perspective view of the integrated window regulator carrier of FIG. 2, illustrating a first receiver on one side of a vertical channel and a second receiver on another side of the vertical channel.
Figure 10:
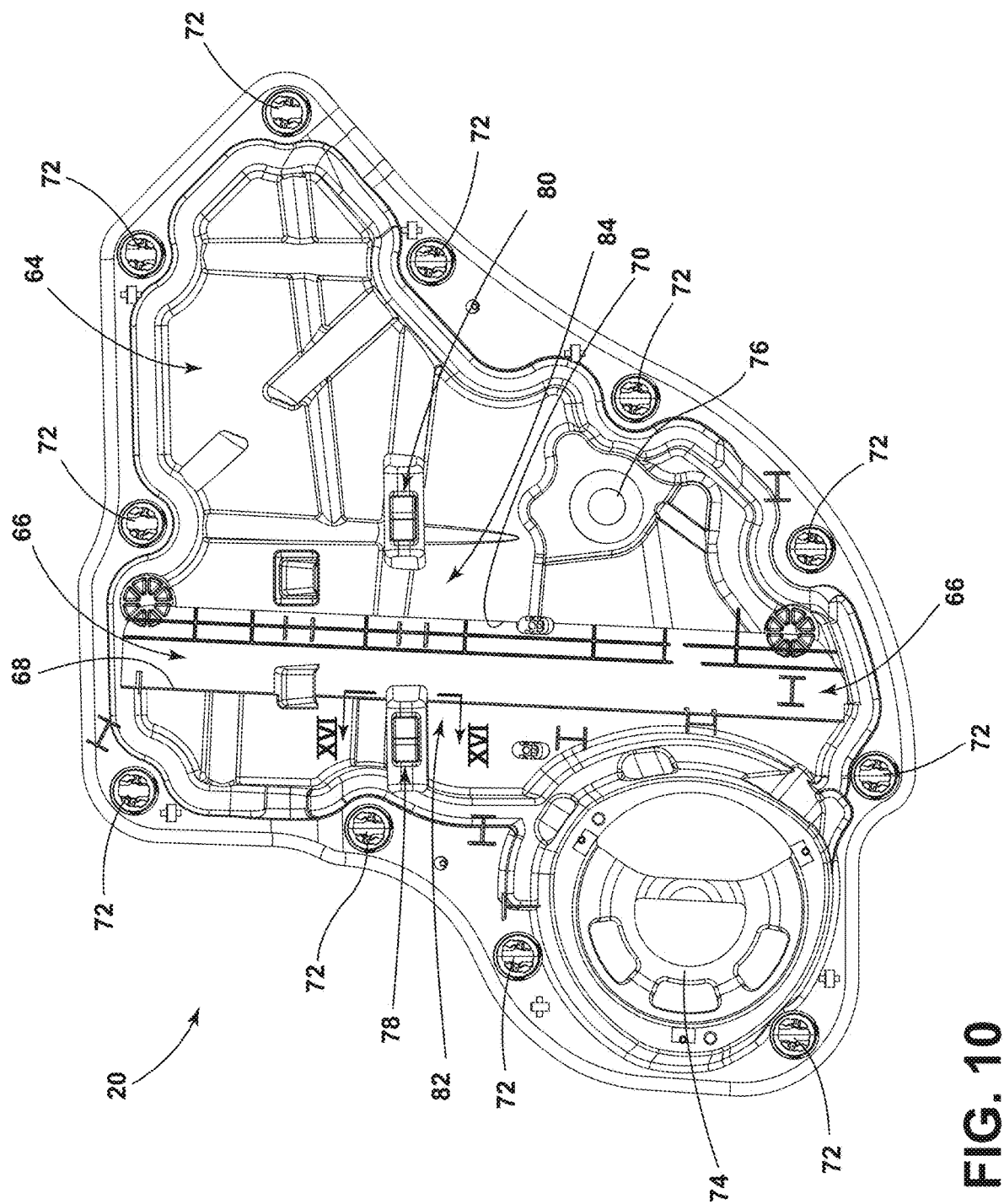
FIG. 10 is a view of the integrated window regulator carrier of FIG. 2, illustrating an interior facing side.
Figure 11:
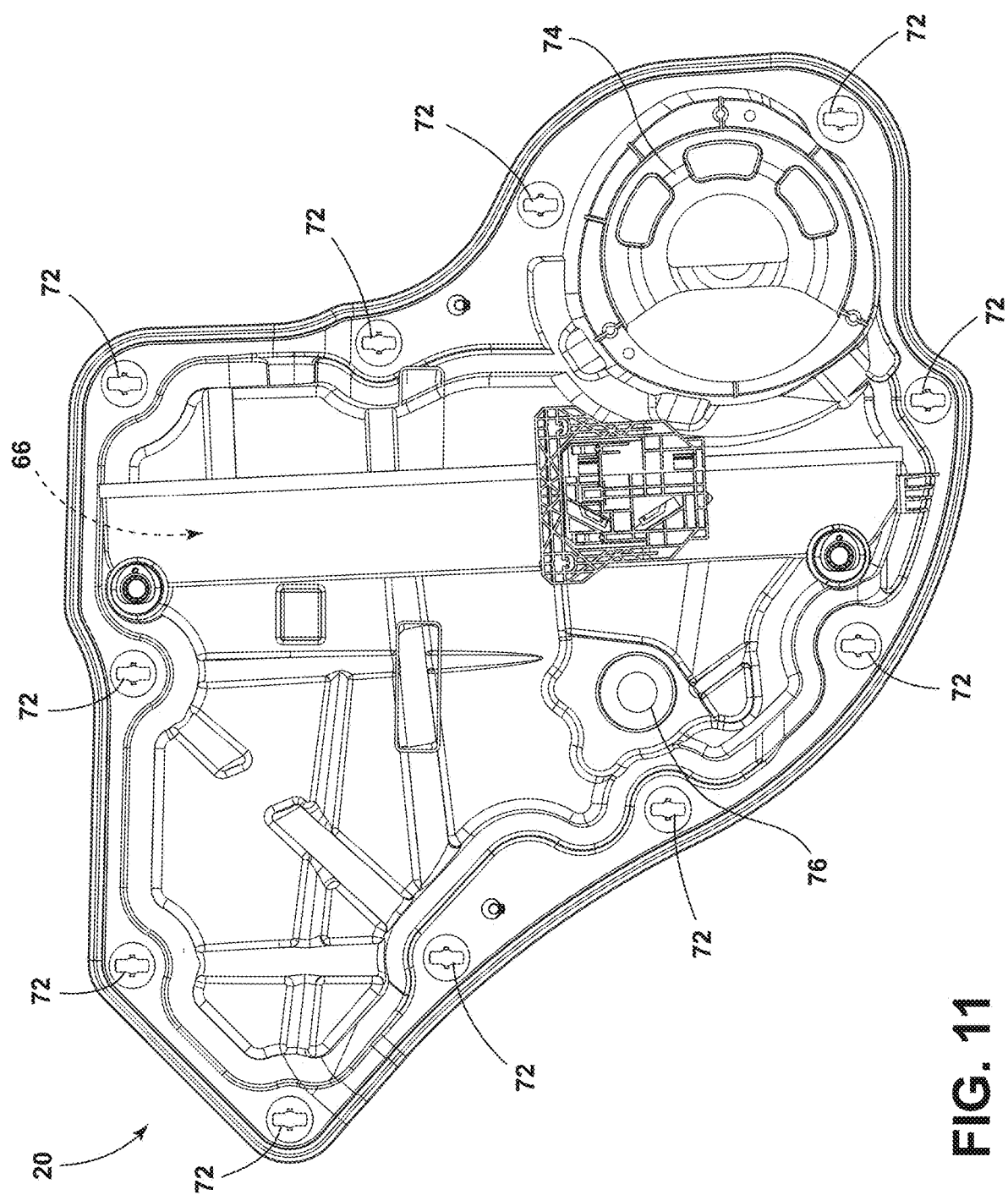
FIG. 11 is a view of the integrated window regulator carrier of FIG. 2.

For purposes of description herein, the terms "upper," "lower," "right," "left," "rear," "front," "vertical," "horizontal," and derivatives thereof shall relate to the disclosure as oriented in FIGS. 1-3. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, a vehicle 10 includes a passenger door assembly 12. The passenger door assembly 12, when closed, separates an interior 14 of the vehicle 10 from an exterior 16. The vehicle 10 can be a car, truck, or van, among other things.

The passenger door assembly 12 includes a frame 18, an integrated window regulator carrier 20 attached to the frame 18, and an interior door trim panel 22 that is also attached to the frame 18 and covers the integrated window regulator carrier 20. The passenger door assembly 12 further includes a bracket 24 that interconnects with both the integrated window regulator carrier 20 and the interior door trim panel 22. The frame 18 can be made from sheet metal, among other materials. The frame 18 can be attached to the vehicle 10 with hinge assemblies (not shown), allowing the passenger door assembly 12 to open and close, which allows a passenger to enter and exit the interior 14 of the vehicle 10.

Referring to FIGS. 3-8, the bracket 24 includes an elongated middle portion 26, a first end portion 28, and a second end portion 30. The second end portion 30 is opposite the first end portion 28, that is, located on the opposite end of the bracket 24 as the first end portion 28. The elongated middle portion 26 is between the first end portion 28 and the second end portion 30. The bracket 24 can be symmetrical about a midline 32 through the elongated middle portion 26. As will be apparent below, the symmetrical shape of the bracket 24 allows for easier assembly of the passenger door assembly 12.

The first end portion 28 has a first width 34a, which can be parallel to the midline 32, at a first point 36a. The first end portion 28 has a second width 38a, parallel to the first width 34a and the midline 32, at a second point 40a. The second width 38a is wider than the first width 34a. The first point 36a is closer to the elongated middle portion 26 (and the midline 32) than the second point 40a. Because the embodiment illustrated herein is symmetrical about the midline 32, the second end portion 30 likewise has a first width 34b, which can be parallel to the midline 32, at a first point 36b and a second width 38b, parallel to the first width 34b, at a second point 40b that is wider than the first width 34b. Again, the first point 36b of the second end portion 30 is closer to the elongated middle portion 26 (and the midline 32) than the second point 40b. In other words, at least part of the first end portion 28 is wider relative to another part of the first end portion 28 and at least part of the second end portion 30 is wider relative to another part of the second end portion 30. As will become apparent below, the widening aspect of the first end portion 28 and the second end portion 30 provides a visual cue when the bracket 24 is assembled with the passenger door assembly 12.

The bracket 24 further includes a top wall 42. The top wall 42 can have planar top surface portion 44 that runs throughout the entirety of the bracket 24 or a portion of the bracket 24. In the embodiment illustrated herein, the top wall 42 has a planar top surface portion 44 essentially the entire length of the bracket 24, including from the first end portion 28 to the second end portion 30.

The bracket 24 further includes a first side wall 46. The first side wall 46 extends downward relative to the top wall 42 (that is, when the planar top surface portion 44 is facing upward). The first side wall 46 extends from the first end portion 28 to the second end portion 30. The bracket 24 further includes a second side wall 48 opposite the first side wall 46; that is, the second side wall 48 is on the opposite side of the bracket 24 as the first side wall 46. The second side wall 48 also extends downward relative to the top wall 42 (that is, when the planar top surface portion 44 is facing upward) and likewise extends from the first end portion 28 to the second end portion 30. The first side wall 46 and the second side wall 48 can form one contiguous wall about the perimeter of the bracket 24. The first side wall 46 has a planar exterior surface portion 50a, which can be orthogonal to the planar top surface portion 44 of the top wall 42. The second side wall 48 also has a planar exterior surface portion 50b, which can be orthogonal to the planar top surface portion 44 of the top wall 42.

The first side wall 46, the second side wall 48, and the top wall 42 form an interior chamber 52. In other words, the bracket 24 can be formed (such as by injection molding) to be largely hollow, bounded by the top wall 42, the first side wall 46, and the second side wall 48. The bracket 24 can further include strengthening portions 54 disposed within the interior chamber 52 extending between, and contiguous with, the first side wall 46 and the second side wall 48. The strengthening portions 54 can be contiguous with the top wall 42. The strengthening portions 54 can be configured to form any of a variety of geometric shapes, so as to provide different levels of strength profiles to the bracket 24.

The bracket 24 can further comprise one or more snap-fit fasteners 56 (e.g., 56a, 56b), such as the snap-fit fastener 56a disposed at the first end portion 28 and the snap-fit fastener 56b disposed at the second end portion 30. The snap-fit fasteners 56 can extend downward relative to the top wall 42. Each of the snap-fit fasteners 56 can include the same features. For example, snap-fit fastener 56b (see FIG. 6) includes a cantilever portion 58b, which extends downward relative to the top wall 42, that terminates with a catch flange 60b. Each of the snap-fit fasteners 56 engages with a snap-fit receiver on the integrated window regulator carrier 20, as discussed below. The bracket 24 can further include an aperture 62 (see FIG. 4), which provides a connection opportunity as discussed below. The aperture 62 can be located at the midline 32 and disposed through the top wall 42. The bracket 24 is preferably molded plastic. As further discussed below, the bracket 24 can be connected to the integrated window regulator carrier 20 and the interior door trim panel 22 can be connected to the bracket 24.

Referring now to FIGS. 9-19, the integrated window regulator carrier 20 has an interior facing side 64. The interior facing side 64 is the side that is closest to the interior 14 of the vehicle 10, when the passenger door assembly 12 is closed. The interior facing side 64 is the side that abuts the interior door trim panel 22. The integrated window regulator carrier 20 includes a vertical channel 66 that is recessed into the interior facing side 64 and a first channel wall 68 and a second channel wall 70 can define the lateral edges of the vertical channel 66. The integrated window regulator carrier 20 includes a plurality of attachment points 72 at which the integrated window regulator carrier 20 is attached to the frame 18. The integrated window regulator carrier 20 may further include a speaker hub 74, to which an audio speaker can be mounted, and an aperture 76 through which a window regulator motor shaft may extend. The integrated window regulator carrier 20 provides a mounting support structure for a window regulator assembly (not shown), which regulates the raising and lowering of a window pane included therewith. Various wiring (not shown) associated with the window regulator assembly may be attached to the integrated window regulator carrier 20.

The integrated window regulator carrier 20 further comprises a first receiver 78 for the bracket 24. The first receiver 78 is disposed to a first side 82 of the vertical channel 66. The first receiver 78 projects from the interior facing side 64. The integrated window regulator carrier 20 further comprises a second receiver 80 for the bracket 24. The second receiver 80 is opposite the first receiver 78; that is, the second receiver 80 is disposed at a second side 84 of the vertical channel 66. Like the first receiver 78, the second receiver 80 projects outward from the interior facing side 64.

The first receiver 78 and the second receiver 80 can include the same features; that is, the first receiver 78 and the second receiver 80 can be mirror images of each other. Thus, only the features of the first receiver 78 will be herein discussed, understanding that the second receiver 80 also includes all of those features. In this regard, the first receiver 78 includes a first retaining surface 86a (see FIGS. 16 and 17) and a second retaining surface 88a. The second retaining surface 88a is opposite the first retaining surface 86a and faces the first retaining surface 86a. As will be apparent below, the first retaining surface 86a and the second retaining surface 88a abut the bracket 24 when assembled as part of the passenger door assembly 12 and oppose the opening and closing forces that the bracket 24 imposes on the first receiver 78 and the second receiver 80, respectively, when a passenger uses the grab handle 118 (discussed below) of the interior door trim panel 22 to open and close the passenger door assembly 12 from the interior 14 of the vehicle 10.

The first receiver 78 includes a bottom retaining surface 90a that lies between the first retaining surface 86a and the second retaining surface 88a. The bottom retaining surface 90a, as discussed below, supports and abuts the bracket 24 when assembled as part of the passenger door assembly 12. The bottom retaining surface 90a, the first retaining surface 86a, and the second retaining surface 88a can be planar. Further, the first retaining surface 86a and the second retaining surface 88a can be parallel to each other and at least approximately orthogonal to the bottom retaining surface 90a.

The first receiver 78 further includes a lateral retaining surface 92a. The lateral retaining surface 92a can include a planar portion at least approximately orthogonal to the bottom retaining surface 90a and at least approximately orthogonal to both the first retaining surface 86a and the second retaining surface 88a. The lateral retaining surface 92a of the first receiver 78 faces the lateral retaining surface 92b of the second receiver 80. As discussed below, the first receiver 78 and the second receiver 80 thus support the bracket 24, when assembled into the passenger door assembly 12, from below the bracket 24, to one side of the bracket 24, to an opposing side of the bracket 24, and laterally on both sides of the bracket 24.

The planar portion of the lateral retaining surface 92a has a length 94a parallel to the bottom retaining surface 90a. This length 94a is longer than a parallel distance 96a between the first retaining surface 86a and the second retaining surface 88a.

The first receiver 78 can further include a first transition surface portion 98a that forms a contiguous surface transition between the first retaining surface 86a and the lateral retaining surface 92a. The first receiver 78 can further include a second transition surface portion 100a that forms a contiguous surface transition between the second retaining surface 88a and the lateral retaining surface 92a. The first transition surface portion 98a and the second transition surface portion 100a can be at least approximately orthogonal to the bottom retaining surface 90a. The transition from the first retaining surface 86a and first transition surface portion 98a forms an obtuse angle 102a. Likewise, the transition from the second retaining surface 88a and the second transition surface portion 100a forms an obtuse angle 104a. The obtuse angles 102a, 104a represent a widening of the first receiver 78 to accept the first end portion 28 of the bracket 24, providing another visual cue for assembly.

Figure 12:
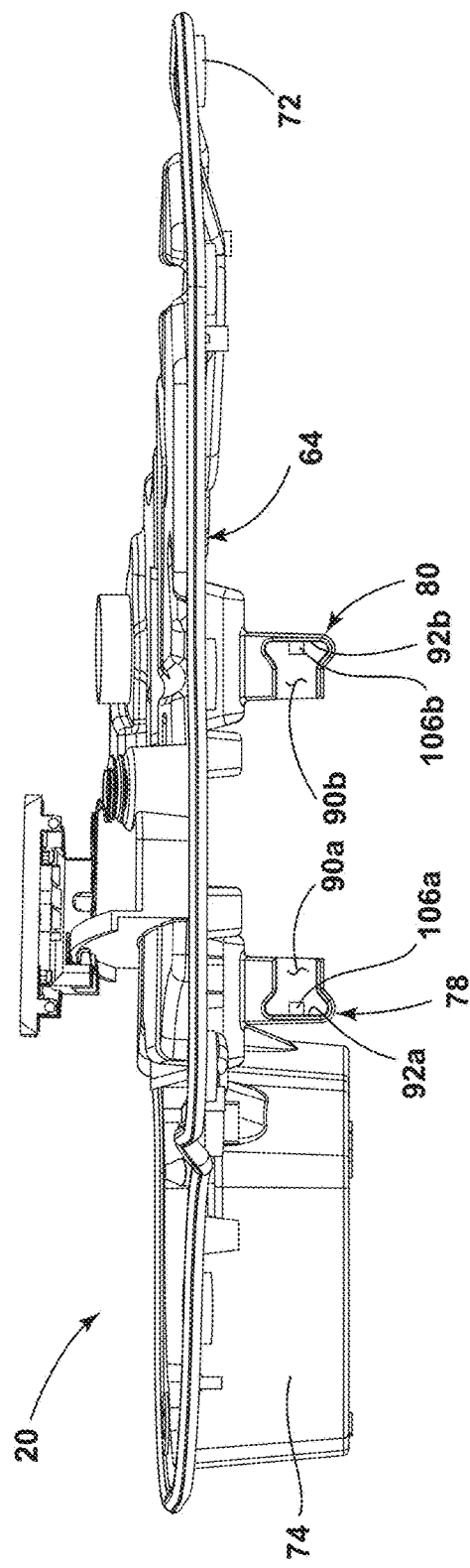
FIG. 12 is a top view of the integrated window regulator carrier of FIG. 2, illustrating a lateral retaining surface, a bottom retaining surface, and a snap-fit receiver of both the first receiver and the second receiver.
Figure 13:
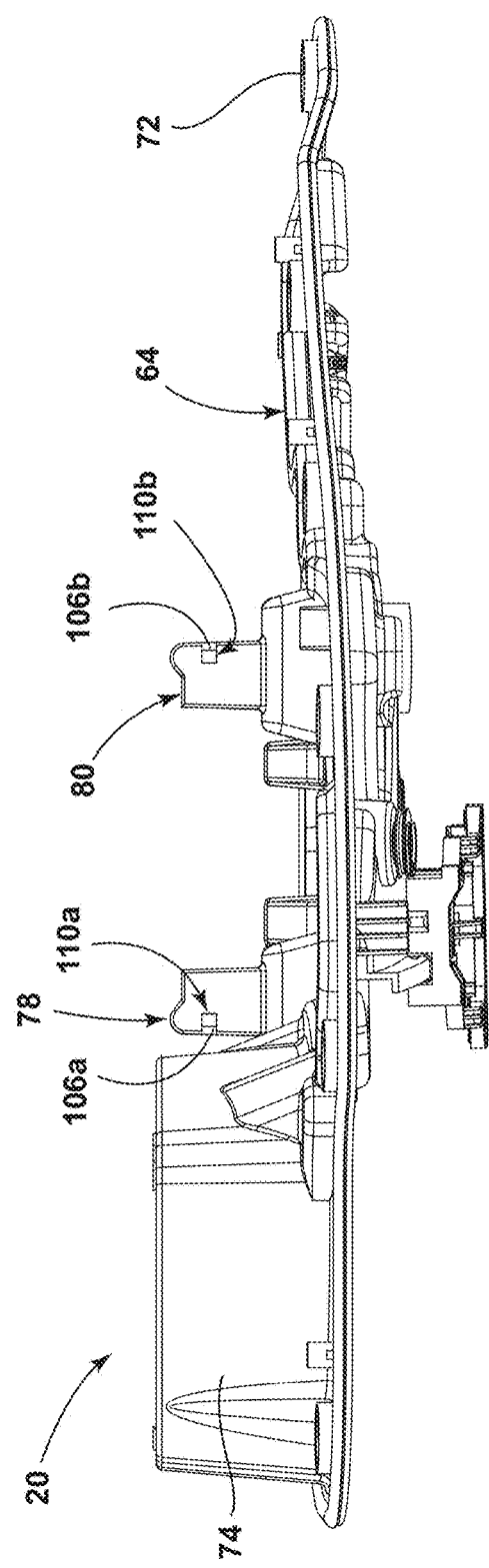
FIG. 13 is a bottom view of the integrated window regulator carrier of FIG. 2, illustrating an aperture forming the snap-fit receiver on both the first receiver and the second receiver.
Figure 15:
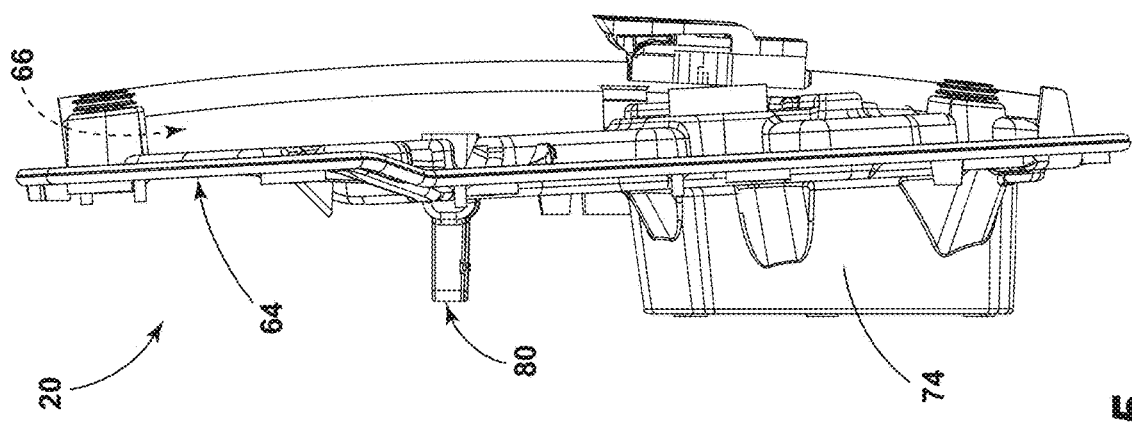
FIG. 15 is a view of the other side of the integrated window regulator carrier of FIG. 2, illustrating the vertical channel recessed into the interior facing side.
Figure 14:
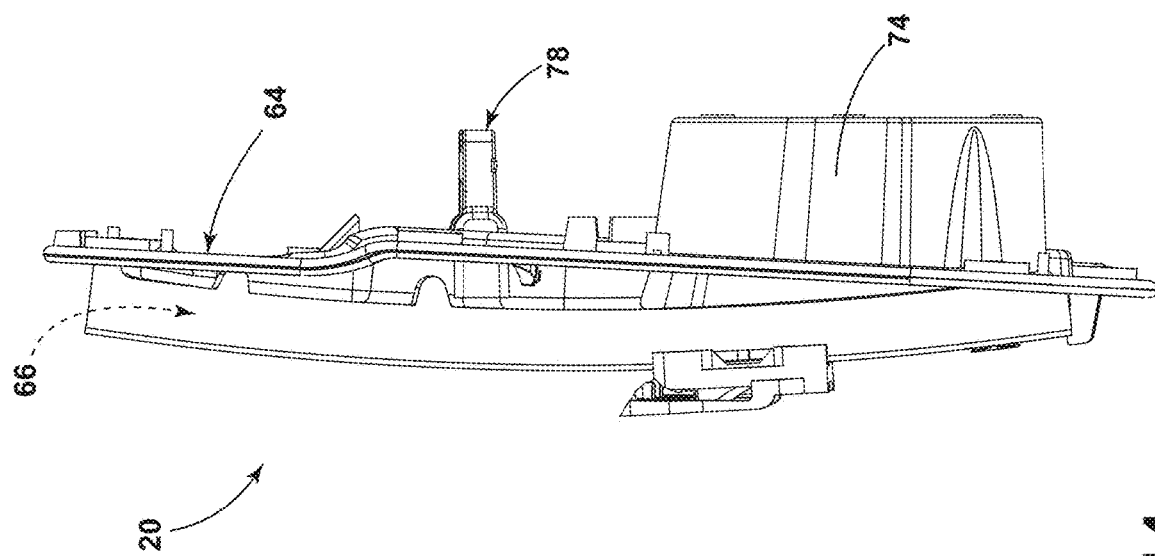
FIG. 14 is a view of the integrated window regulator carrier of FIG. 2, illustrating the vertical channel recessed into the interior facing side.
Figure 16:
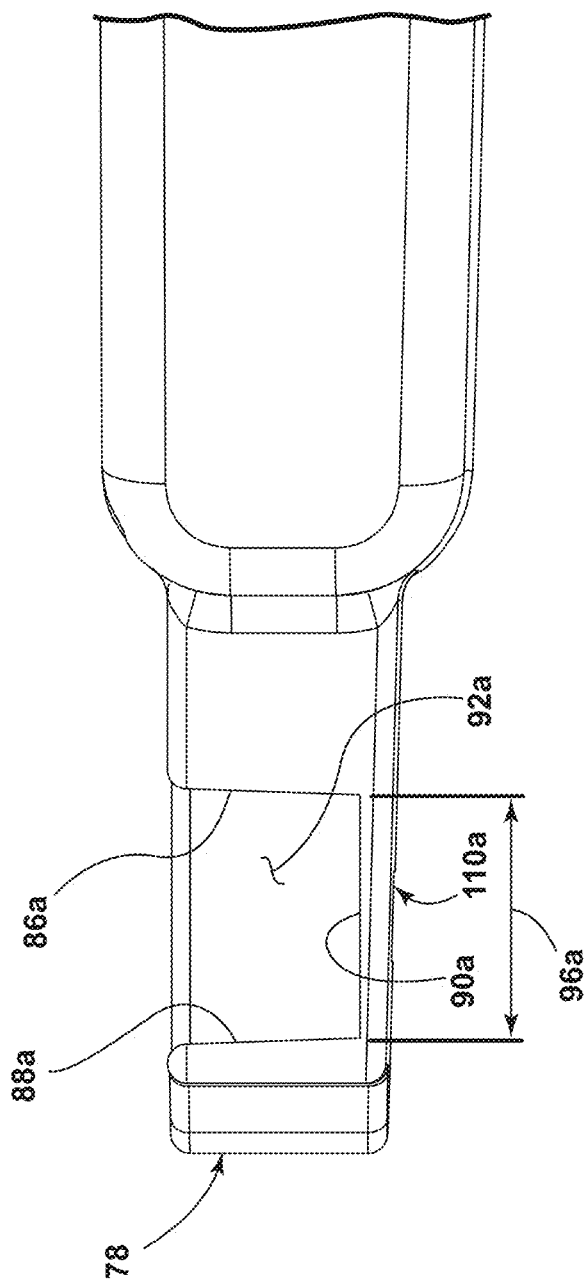
FIG. 16 is a cross-sectional view of the integrated window regulator carrier of FIG. 2, taken through line XVI-XVI of FIG. 10, illustrating a first retaining surface and an opposing second retaining surface on the first receiver.
Figure 17:
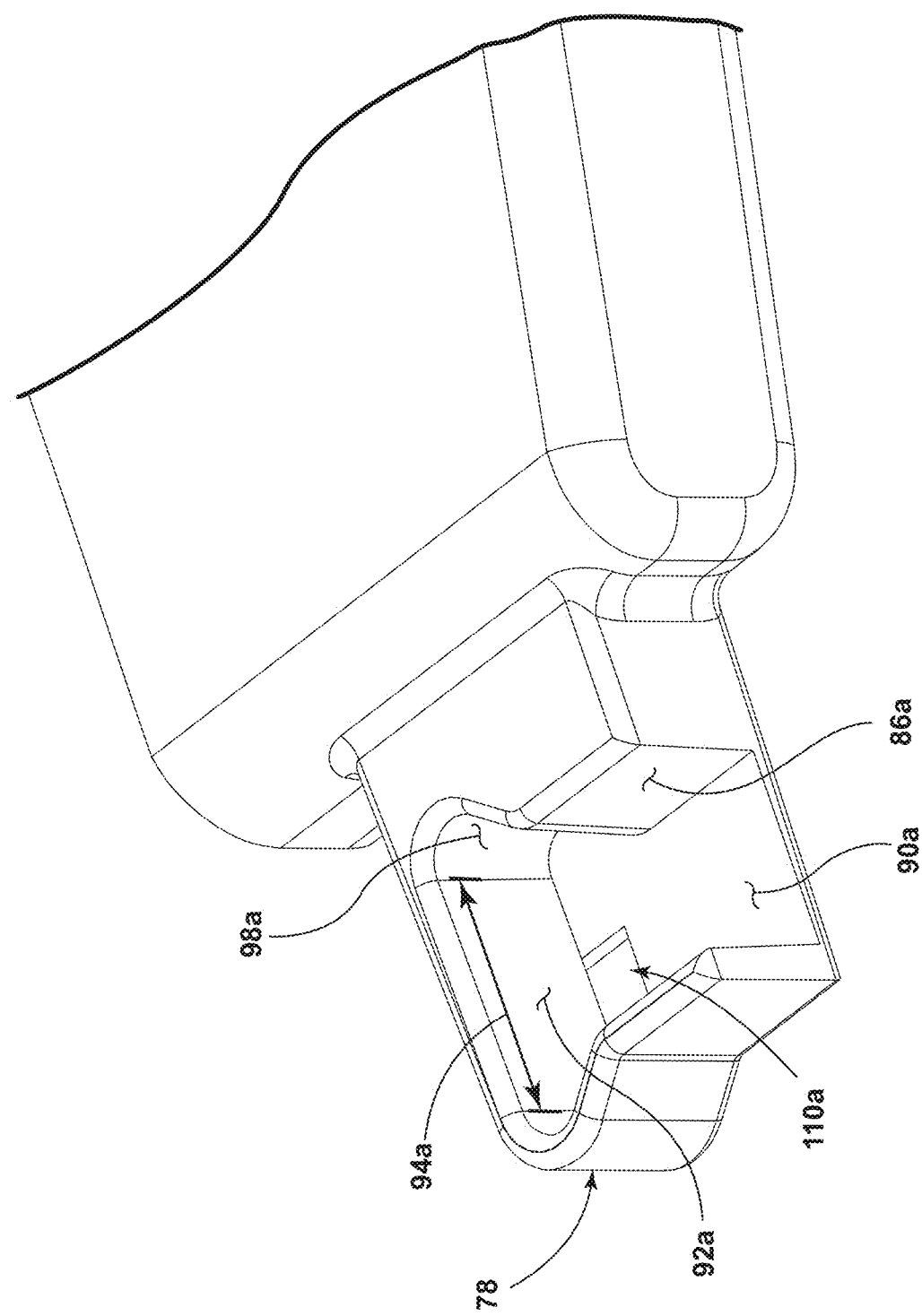
FIG. 17 is a perspective view of the portion of the integrated window regulator carrier of FIG. 2 illustrated at FIG. 16, showing a first transition surface portion between the first retaining surface and the lateral retaining surface.
Figure 18:
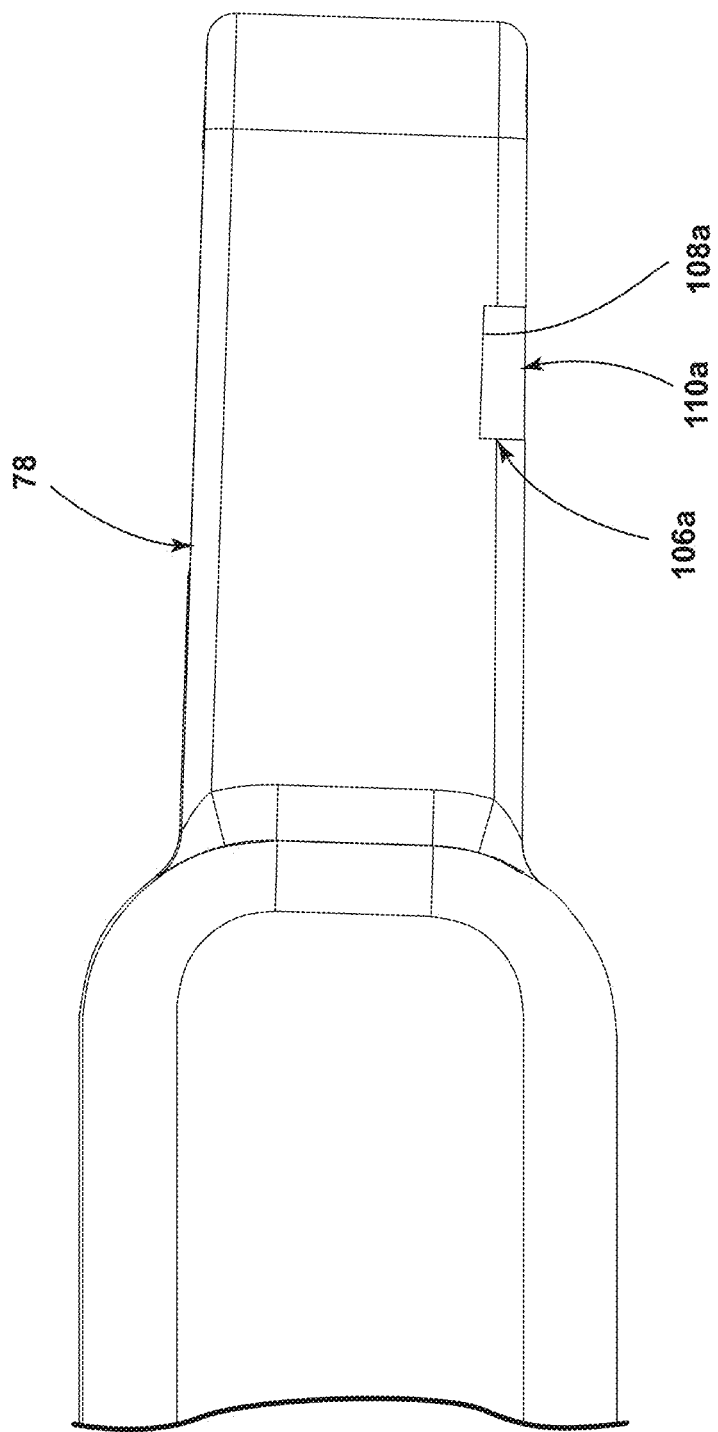
FIG. 18 is a view of the portion of the integrated window regulator carrier of FIG. 2 illustrated at FIG. 16, showing the aperture and a catch abutting surface of the snap-fit receiver of the first receiver.
Figure 19:
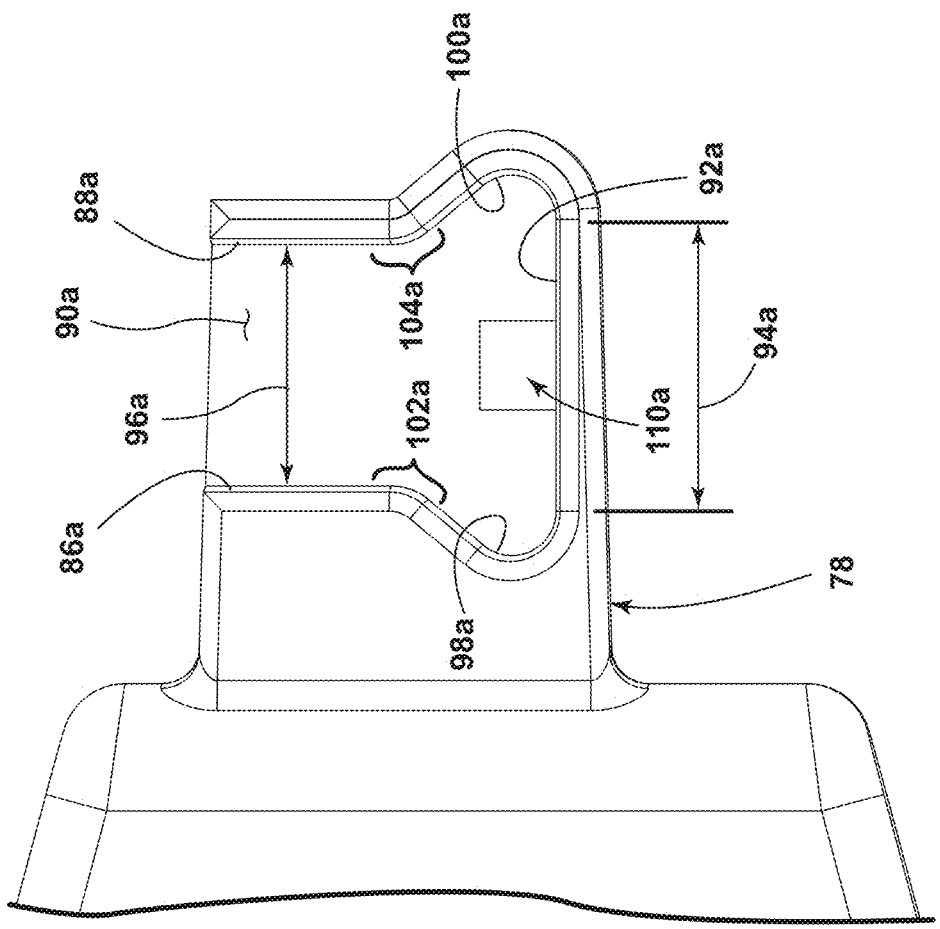
FIG. 19 is an overhead view of the portion of the integrated window regulator carrier of FIG. 2 illustrated at FIG. 16, showing the first receiving surface and the first transition surface portion forming an obtuse angle.
Figure 20:
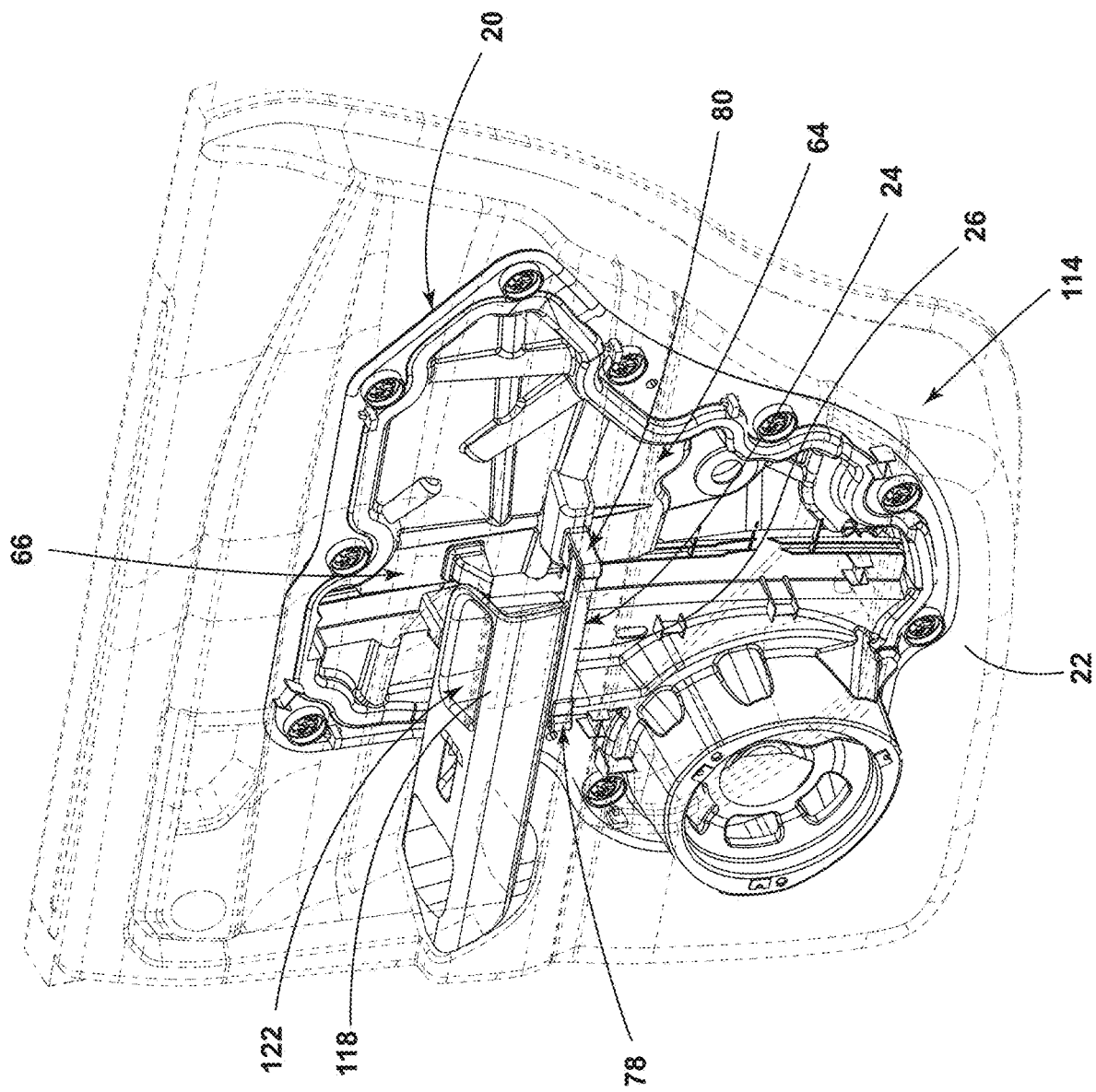
FIG. 20 is a perspective view of the passenger door assembly of FIG. 2 (less the frame) illustrating the interior door trim panel of FIG. 2 attached to the bracket, which is received by the first receiver and the second receiver of the integrated window regulator carrier.
Figure 21:
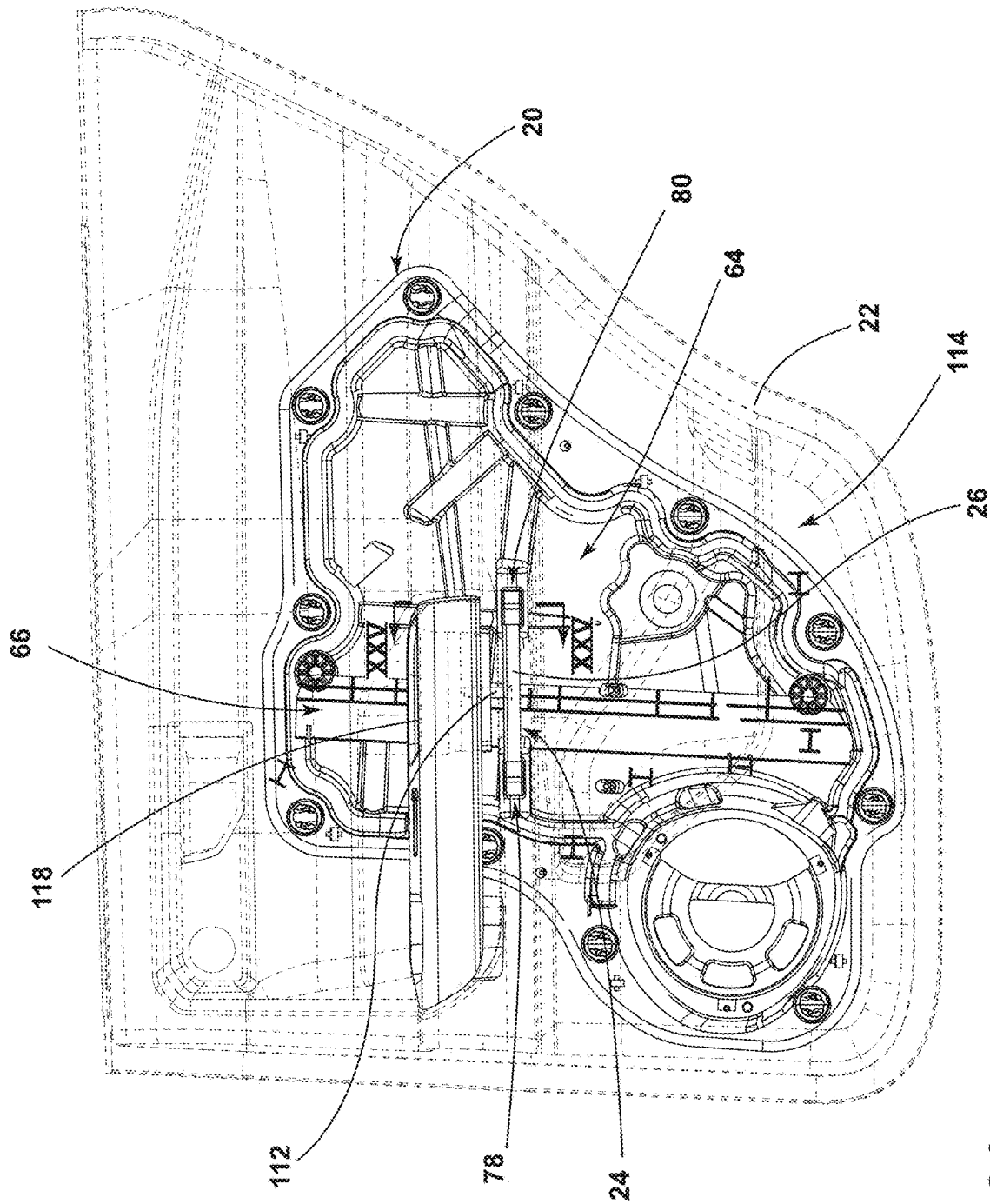
FIG. 21 is a view of the passenger door assembly of FIG. 20, illustrating a connector connecting the interior door trim panel at the grab handle to the bracket.
Figure 23:
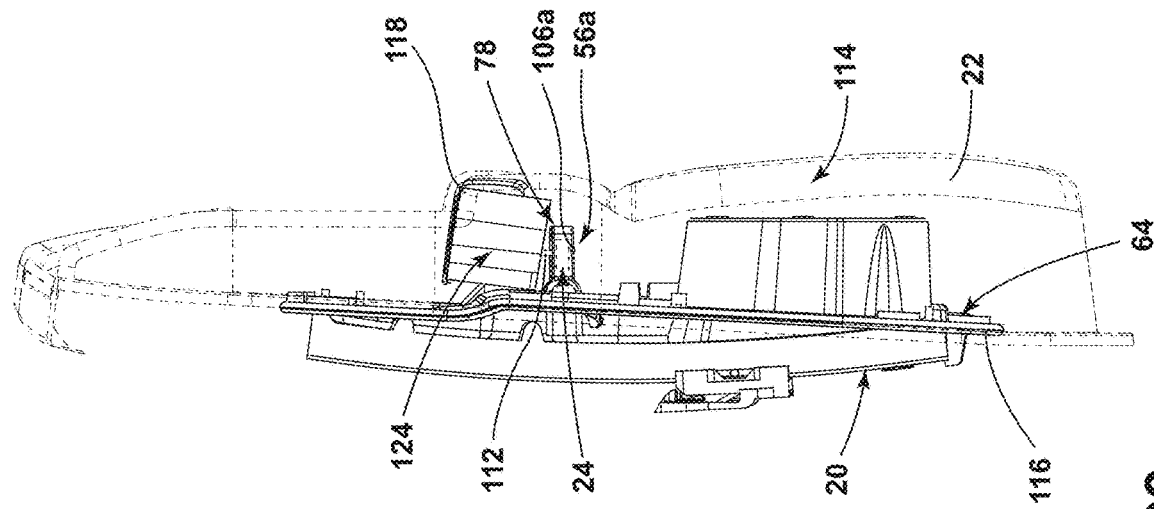
FIG. 23 is a view of the other side of the passenger door assembly of FIG. 20.
Figure 22:
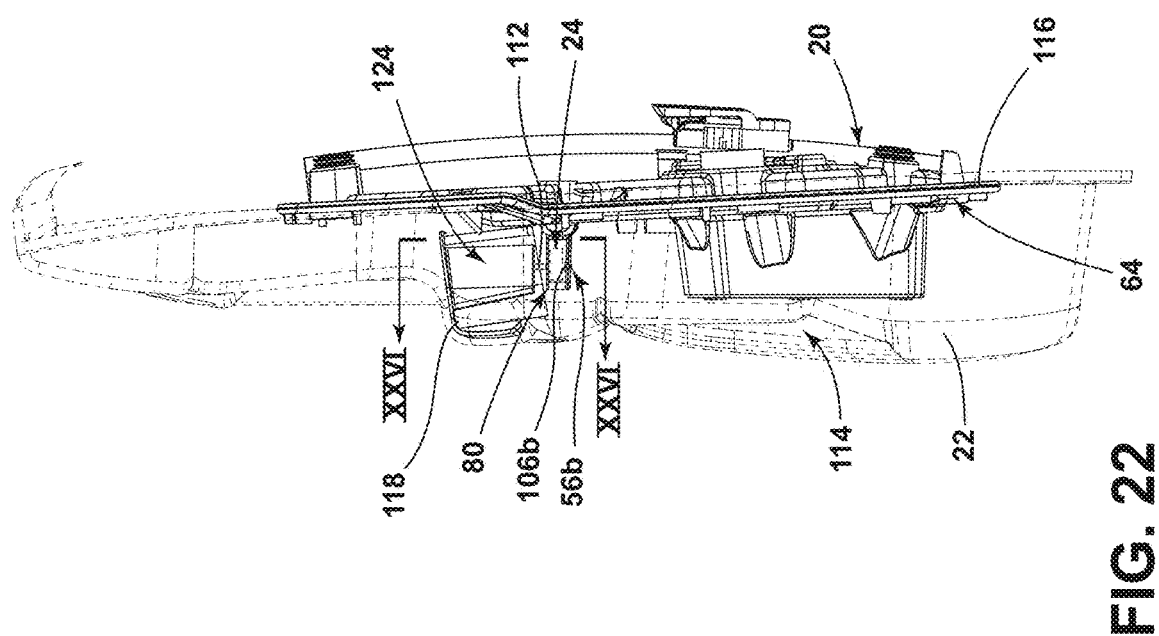
FIG. 22 is a view of the passenger door assembly of FIG. 20, illustrating the grab handle forming a protrusion on the other side of the interior door trim panel, which protrusion is attached to the bracket via the connector.
Figure 24:
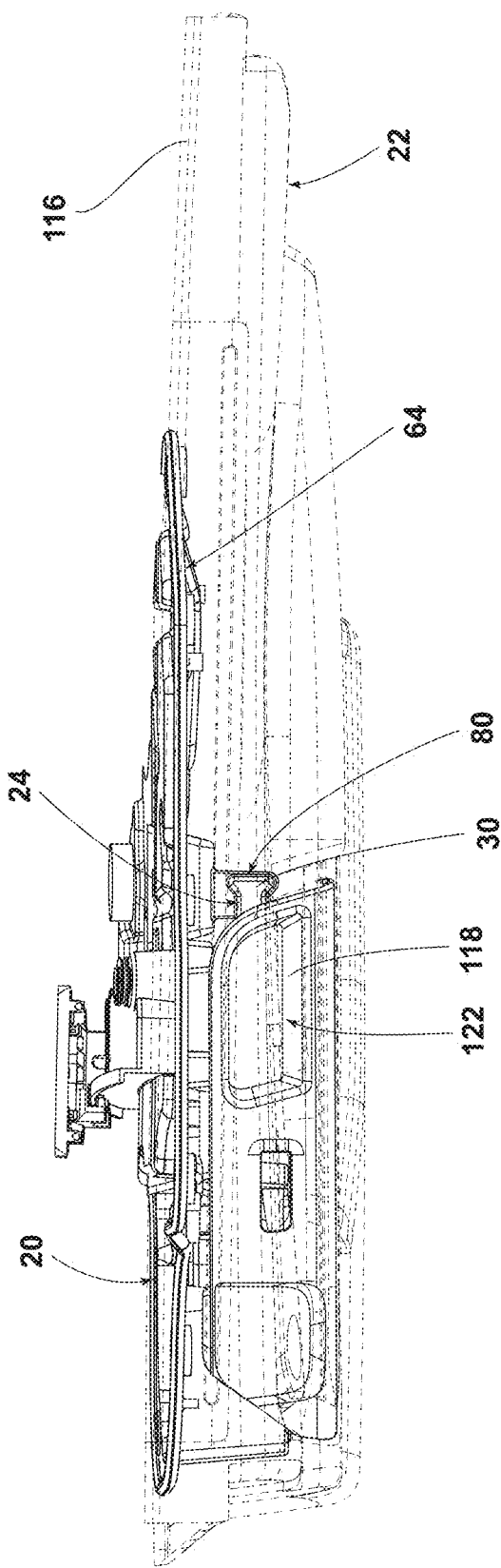
FIG. 24 is an overhead view of the passenger door assembly of FIG. 20, illustrating the recess part of the grab handle.
Figure 25:
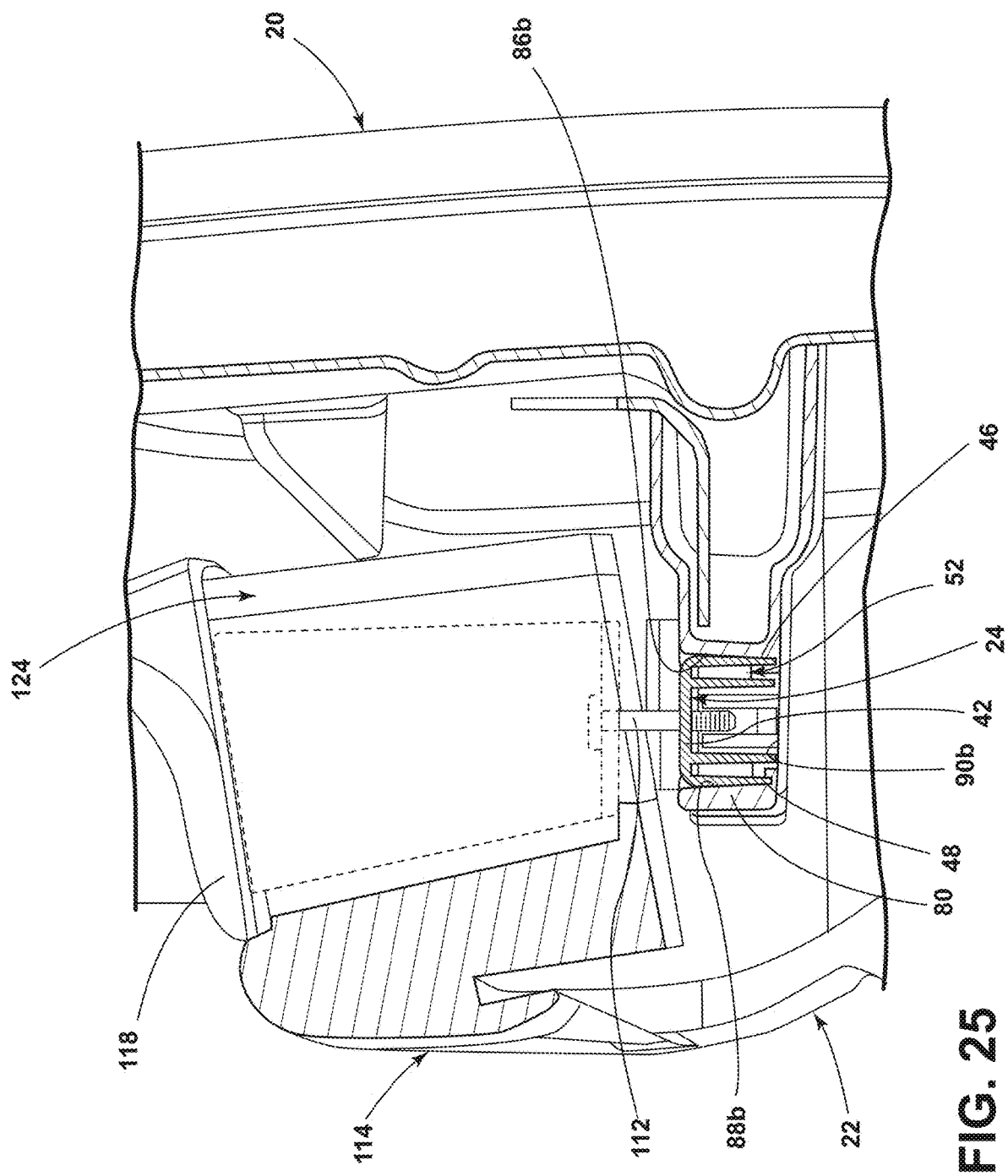
FIG. 25 is a cross-sectional view of the passenger door assembly of FIG. 20 taken through line XXV-XXV of FIG. 21, illustrating the bottom retaining surface of the second receiver retaining the second end portion of the bracket.
Figure 26:
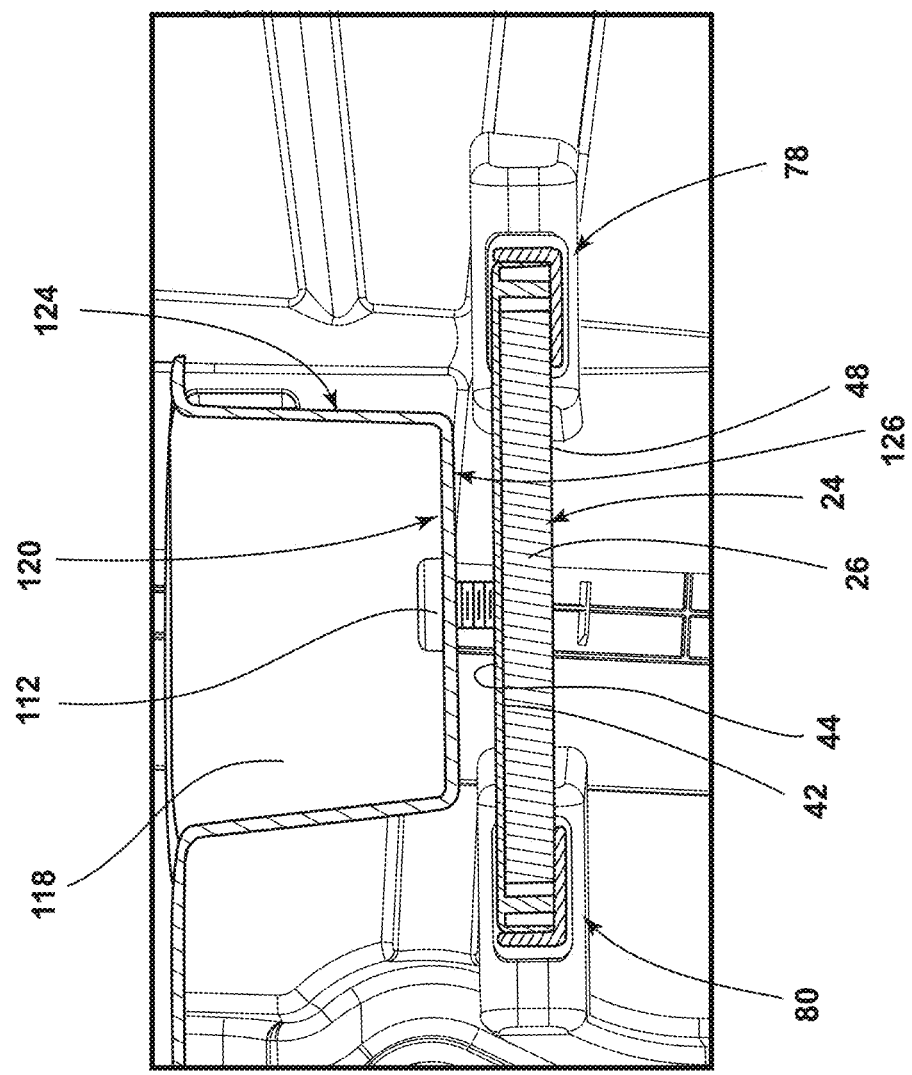
FIG. 26 is a cross-sectional view of the passenger door assembly of FIG. 20 taken through line XXVI-XXVI of FIG. 22, illustrating a planar horizontal surface of the protrusion of the interior door trim facing the planar top surface of the top wall of the bracket.

The first receiver 78 further includes a snap-fit receiver 106a (see, e.g., FIG. 12). The snap-fit receiver 106a is configured to receive and connect with the snap-fit fastener 56a on the bracket 24, when assembled into the passenger door assembly 12. Accordingly, the snap-fit receiver 106a includes a catch abutting surface 108a, accessible through an aperture 110a, that "catches" the catch flange 60a of the snap-fit fastener 56a.

Although the embodiment of the bracket 24 disclosed herein is symmetrical about the midline 32 and the first receiver 78 and the second receiver 80 accommodate this symmetry, the bracket 24 need not be symmetrical. In such an asymmetrical embodiment of the bracket 24, the first receiver 78 and the second receiver 80 are shaped to match the end portion and the second end portion of the asymmetrical bracket 24, so that the bracket 24 can only be attached to the integrated window regulator carrier 20 in the correct orientation.

Referring now to FIGS. 20-26, an embodiment of the passenger door assembly 12, without the frame 18, is illustrated, showing the bracket 24 connected to the interior door trim panel 22, via a connector 112. The first receiver 78 of the integrated window regulator carrier 20 has received and is connected to the first end portion 28 of the bracket 24. The second receiver 80 of the integrated window regulator carrier 20 has received and is connected to the second end portion 30 of the bracket 24. The bottom retaining surface 90a of the first receiver 78 and the bottom retaining surface 90b of the second receiver 80 both face the bracket 24. The first retaining surface 86a of the first receiver 78 faces the first side wall 46 of the bracket 24, adjacent the first end portion 28 of the bracket 24. The second retaining surface 88a of the first receiver 78 faces the second side wall 48 of the bracket 24, adjacent the first end portion 28 of the bracket 24. Likewise, the first retaining surface 86b (see FIG. 25) of the second receiver 80 faces the first side wall 46 of the bracket 24, adjacent the second end portion 30 of the bracket 24, and the second retaining surface 88b of the second receiver 80 faces the second side wall 48 of the bracket 24, adjacent the second end portion 30 of the bracket 24. The snap-fit receiver 106a of the first receiver 78 has connected with the snap-fit fastener 56a on the first end portion 28 of the bracket 24. The snap-fit receiver 106b of the second receiver 80 has connected with the snap-fit fastener 56b on the second end portion 30 of the bracket 24.

The interior door trim panel 22 includes an interior side 114 (see FIGS. 2 and 20), which faces the interior 14 of the vehicle 10 when the passenger door assembly 12 is closed. The interior door trim panel 22 further includes another side 116, which is opposite the interior side 114, facing the integrated window regulator carrier 20. The interior door trim panel 22 further includes the grab handle 118, which is located at (accessible from) the interior side 114. The grab handle 118 is a handle that a passenger of the vehicle 10 can grab to pull the passenger door assembly 12 and therefore close the passenger door assembly 12 when the passenger is in the interior 14 of the vehicle 10 and the passenger door assembly 12 is open.

The interior door trim panel 22 is connected to the bracket 24 near the grab handle 118. For example, the connector 112 can be disposed through an aperture in a bottom wall 120 of the grab handle 118, through the interior door trim panel 22 to the other side, and into the aperture 62 in the bracket 24, thus connecting the grab handle 118 to the bracket 24. The grab handle 118 can take the form of a recess 122 in the interior door trim panel 22 at the interior side 114. The other side 116 of interior door trim panel 22 can have a protrusion 124 generally matching the recess 122. The protrusion 124 thus faces the integrated window regulator carrier 20. The interior door trim panel 22 can be connected with the bracket 24 at this protrusion 124. The aperture 62 of the bracket 24 can be placed at the elongated middle portion 26 of the bracket 24, allowing the interior door trim panel 22 to be interconnected with the bracket 24 at the elongated middle portion 26 of the bracket 24. The protrusion 124 has a planar horizontal surface 126 (see FIG. 26). The planar horizontal surface 126 faces the planar top surface portion 44 of the top wall 42 of the bracket 24.

When an integrated window regulator carrier 20 has one vertical channel 66 centrally located and the integrated window regulator carrier 20 is part of a passenger door assembly 12 including an interior door trim panel 22 with a grab handle 118, it is beneficial to attach the interior door trim panel 22 to the integrated window regulator carrier 20 at the grab handle 118. Attaching the interior door trim panel 22 to the integrated window regulator carrier 20 of the present disclosure via the bracket 24 of the present disclosure prevents the grab handle 118 area of the interior door trim panel 22 from bowing inward when the passenger pulls the passenger door assembly 12 closed. Because the bracket 24 spans the vertical channel 66 of the integrated window regulator carrier 20, the interior door trim panel 22 is attached to the integrated window regulator carrier 20 at the grab handle 118 area, but the attachment does not interfere with the vertical channel 66 or items attached to the integrated window regulator carrier 20 in the vertical channel 66. Because the bracket 24 can be a plastic molded component, the use of an expensively stamped metal bracket is avoided. Additionally, stamped metal brackets are heavier and difficult to attach to the integrated window regulator carrier 20. Moreover, because the bracket 24 can be symmetrical, the bracket 24 can be used with a passenger door assembly 12 on both the right and left sides of the vehicle 10, which may not be possible with stamped metal brackets.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An integrated window regulator carrier for a door of a vehicle comprising:
    a side;
    a vertical channel recessed into the side, with a first channel wall and a second channel wall defining lateral edges of the vertical channel;
    a first receiver disposed to a first side of the vertical channel, and projecting away from the side; and
    a second receiver disposed to a second side of the vertical channel and projecting away from the side, and opposing the first receiver;
    wherein, each of the first receiver and the second receiver comprise:
        a bottom retaining surface;
        a first retaining surface extending upward from the bottom retaining surface;
        a second retaining surface opposing the first retaining surface, the second retaining surface extending upward from the bottom retaining surface; and
        a lateral retaining surface that extends upward from the bottom retaining surface;
    wherein, the lateral retaining surface of the first receiver opposes the lateral retaining surface of the second receiver;
    wherein, the first retaining surface and the second retaining surface of both the first receiver and the second receiver are separated by a distance; and
    wherein, the lateral retaining surface of the first receiver has a length that is parallel to the bottom retaining surface of the first receiver and longer than the distance between the first retaining surface and the second retaining surface of the first receiver; and
    wherein, the lateral retaining surface of the second receiver has a length that is parallel to the bottom retaining surface of the second receiver and longer than the distance between the first retaining surface and the second retaining surface of the second receiver.

2. The integrated window regulator carrier of claim 1, the first receiver is a mirror image of the second receiver.

3. The integrated window regulator carrier of claim 1,
    the lateral retaining surface of the first receiver includes a planar portion that is orthogonal to the bottom retaining surface of the first receiver; and
    the lateral retaining surface of the second receiver includes a planar portion that is orthogonal to the bottom retaining surface of the second receiver.

4. The integrated window regulator carrier of claim 1,
    wherein, the bottom retaining surface, the first retaining surface, and the second retaining surface of the first receiver are all planar;
    wherein, the first retaining surface of the first receiver is parallel to the second retaining surface of the first receiver, and both the first retaining surface and the second retaining surface of the first receiver are orthogonal to the bottom surface of the first receiver;
    wherein, the bottom retaining surface, the first retaining surface, and the second retaining surface of the second receiver are all planar; and
    wherein, the first retaining surface of the second receiver is parallel to the second retaining surface of the second receiver, and both the first retaining surface and the second retaining surface of the second receiver are orthogonal to the bottom surface of the second receiver.

5. The integrated window regulator carrier of claim 1,
    each of the first receiver and the second receiver comprising:
        a first transition surface portion that forms a contiguous surface transition between the first retaining surface and the lateral retaining surface; and
        a second transition surface portion that forms a contiguous surface transition between the second retaining surface and the lateral retaining surface;
    the first transition surface portion and the second transition surface portion extend upward from the bottom retaining surface.

6. The integrated window regulator carrier of claim 5,
    the first retaining surface of the first receiver transitions to the first transition surface portion of the first receiver at an obtuse angle, and the second retaining surface of the first receiver transitions to the second transition surface portion of the first receiver at an obtuse angle; and
    the first retaining surface of the second receiver transitions to the first transition surface portion of the second receiver at an obtuse angle, and the second retaining surface of the second receiver transitions to the second transition surface portion of the second receiver at an obtuse angle.

7. The integrated window regulator carrier of claim 1, each of the first receiver and the second receiver include a snap-fit receiver.

8. The integrated window regulator carrier of claim 7, the snap-fit receiver of each of the first receiver and the second receiver include an aperture and a catch abutting surface accessible through the aperture.

9. The integrated window regulator carrier of claim 1 further comprising:
an aperture through the side, the aperture configured to accept a window regulator motor shaft.

10. The integrated window regulator carrier of claim 1 further comprising:
a bracket including a first end portion, a second end portion, and an elongated middle portion disposed between the first end portion and the second end portion;
the first receiver is connected to the first end portion of the bracket, with the bottom retaining surface, the first retaining surface, and the second retaining surface of the first receiver facing the bracket; and
the second receiver is connected to the second end portion of the bracket, with the bottom retaining surface, the first retaining surface, and the second retaining surface of the second receiver facing the bracket.

11. The integrated window regulator carrier of claim 10, the bracket extends across the vertical channel.

12. An integrated window regulator carrier comprising:
a vertical channel; and
a first bracket receiver and a second bracket receiver opposing the first bracket receiver, the first bracket receiver being disposed to one side of the vertical channel, the second bracket receiver being disposed to another side of the vertical channel,
wherein, each of the first bracket receiver and the second bracket receiver comprises:
a bottom retaining surface;
a first retaining surface extending upward from the bottom retaining surface;
a second retaining surface extending upward from the bottom retaining surface and opposing the first retaining surface; and
a lateral retaining surface extending upward from the bottom retaining surface; and
wherein, the lateral retaining surface of the first bracket receiver opposes the lateral retaining surface of the second bracket receiver.

13. The integrated window regulator carrier of claim 12 further comprising:
a speaker hub.

14. The integrated window regulator carrier of claim 12, the vertical channel is recessed and comprises a first channel wall and a second channel wall that opposes the first channel wall.

15. The integrated window regulator carrier of claim 12 further comprising:
a bracket received by both the first bracket receiver and the second bracket receiver,
wherein, the bottom retaining surface of the first bracket receiver and the bottom retaining surface of the second bracket receiver support the bracket from beneath the bracket,
wherein, the first retaining surface of the first bracket receiver and the first retaining surface of the second bracket receiver face the bracket, and
wherein, the second retaining surface of the first bracket receiver and the second retaining surface of the second bracket receiver face the bracket.

16. The integrated window regulator carrier of claim 15,
wherein, both the first bracket receiver and the second bracket receiver further comprise a snap-fit receiver;
wherein, the bracket includes snap-fit fasteners; and
wherein, the snap-fit receiver of the first bracket receiver and the snap-fit receiver of the second bracket receiver are each operably connected with at least one of the snap-fit fasteners of the bracket.

17. The integrated window regulator carrier of claim 16, the bracket spans across the vertical channel.

18. The integrated window regulator carrier of claim 15, the bracket further includes an aperture disposed through a top wall of the bracket.

19. The integrated window regulator carrier of claim 12, the lateral retaining surface of the first bracket receiver is orthogonal to both the first retaining surface and the second retaining surface of the first bracket receiver; and
the lateral retaining surface of the second bracket receiver is orthogonal to both the first retaining surface and the second retaining surface of the second bracket receiver.

20. The integrated window regulator carrier of claim 19 further comprising:
a bracket received by both the first bracket receiver and the second bracket receiver,
wherein, the bottom retaining surface of the first bracket receiver and the bottom retaining surface of the second bracket receiver support the bracket from beneath the bracket,
wherein, the first retaining surface of the first bracket receiver and the first retaining surface of the second bracket receiver face the bracket,
wherein, the second retaining surface of the first bracket receiver and the second retaining surface of the second bracket receiver face the bracket, and
wherein, the lateral retaining surface of the first bracket receiver and the lateral retaining surface of the second bracket receiver face the bracket.

\* \* \* \* \*